(12) United States Patent
Shahar et al.

(10) Patent No.: US 7,362,928 B2
(45) Date of Patent: Apr. 22, 2008

(54) OPTICAL SWITCH AND GATE APPARATUS AND METHOD

(75) Inventors: Arie Shahar, Rye Brook, NY (US); Eldan Halberthal, Rye Brook, NY (US)

(73) Assignee: Main Street Ventures LLC, White Plains, NY (US)

( * ) Notice: Subject to any disclaimer, the term of this patent is extended or adjusted under 35 U.S.C. 154(b) by 625 days.

(21) Appl. No.: 10/852,127

(22) Filed: May 25, 2004

(65) Prior Publication Data

US 2004/0213508 A1 Oct. 28, 2004

Related U.S. Application Data

(63) Continuation-in-part of application No. 10/640,035, filed on Aug. 14, 2003, now Pat. No. 7,212,705, which is a continuation-in-part of application No. 10/640,018, filed on Aug. 14, 2003, now Pat. No. 7,130,539, which is a continuation-in-part of application No. 10/640,017, filed on Aug. 14, 2003, now Pat. No. 7,218,862, which is a continuation-in-part of application No. 10/640,040, filed on Aug. 14, 2003, now Pat. No. 6,956,998.

(60) Provisional application No. 60/475,902, filed on Jun. 5, 2003, provisional application No. 60/405,697, filed on Aug. 22, 2002.

(51) Int. Cl.
*G02B 6/26* (2006.01)

(52) U.S. Cl. .......................... 385/16; 385/15

(58) Field of Classification Search ............... 359/158, 359/332; 385/15–16, 42, 24, 122
See application file for complete search history.

(56) References Cited

U.S. PATENT DOCUMENTS

| | | | | |
|---|---|---|---|---|
| 5,917,979 A * | 6/1999 | Prucnal | ....................... | 385/122 |
| 6,259,552 B1 * | 7/2001 | Boffi et al. | ................. | 359/332 |
| 6,411,415 B1 * | 6/2002 | Smets et al. | ................ | 398/141 |
| 6,424,773 B1 * | 7/2002 | Watanabe | ................... | 385/122 |
| 6,453,082 B1 * | 9/2002 | Watanabe | ................... | 385/15 |
| 6,477,300 B2 * | 11/2002 | Watanabe et al. | ............. | 385/42 |
| 6,646,784 B2 * | 11/2003 | Leuthold | .................... | 359/332 |
| 2001/0053008 A1 * | 12/2001 | Ueno | ........................ | 359/158 |
| 2002/0159730 A1 * | 10/2002 | Watanabe | ................... | 385/122 |

* cited by examiner

*Primary Examiner*—Frank G. Font
*Assistant Examiner*—Guy G Anderson
(74) *Attorney, Agent, or Firm*—EMPK & Shiloh, LLP

(57) ABSTRACT

Some exemplary embodiments of one version of the present invention provide an optical switch including: a splitting device having first, second, third and fourth terminals; a nonlinear element; an attenuator; and an optical loop associated with the third and fourth terminals, the optical loop including the attenuator and the nonlinear element, the nonlinear element being displaced from a mid-point of the optical loop, wherein the splitting device is able to receive an input signal via one of the first and second terminals and an activating signal via one of the first and second terminals and to provide an output signal at one of the first and second terminals in response to the activating signal. In exemplary embodiments of alternative versions of the present inventions, the optical switch may include a threshold device. In some versions, the optical switch may be operated with a continuous wave or a pulse based activating signal.

47 Claims, 10 Drawing Sheets

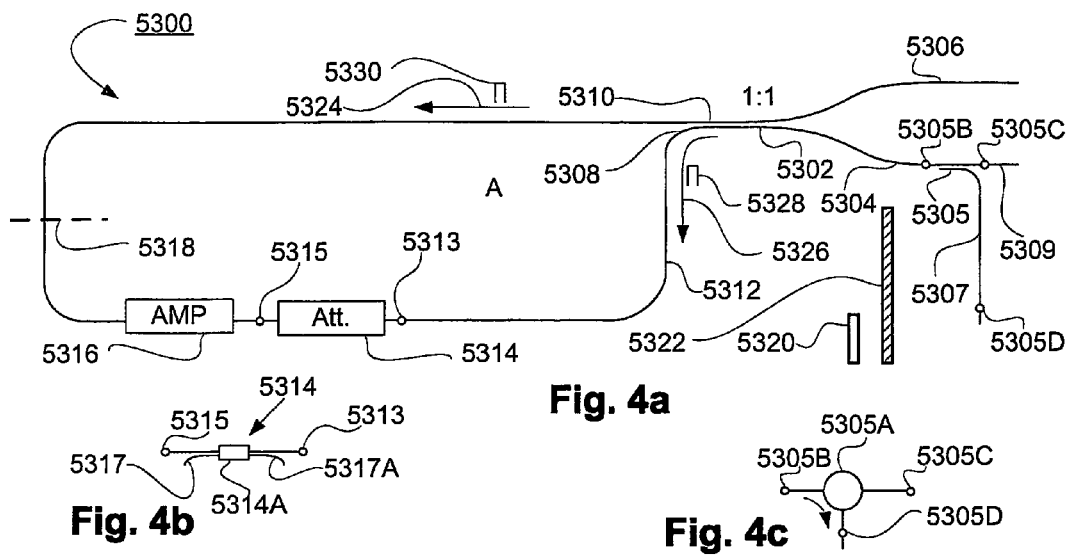
Fig. 4a
Fig. 4b
Fig. 4c
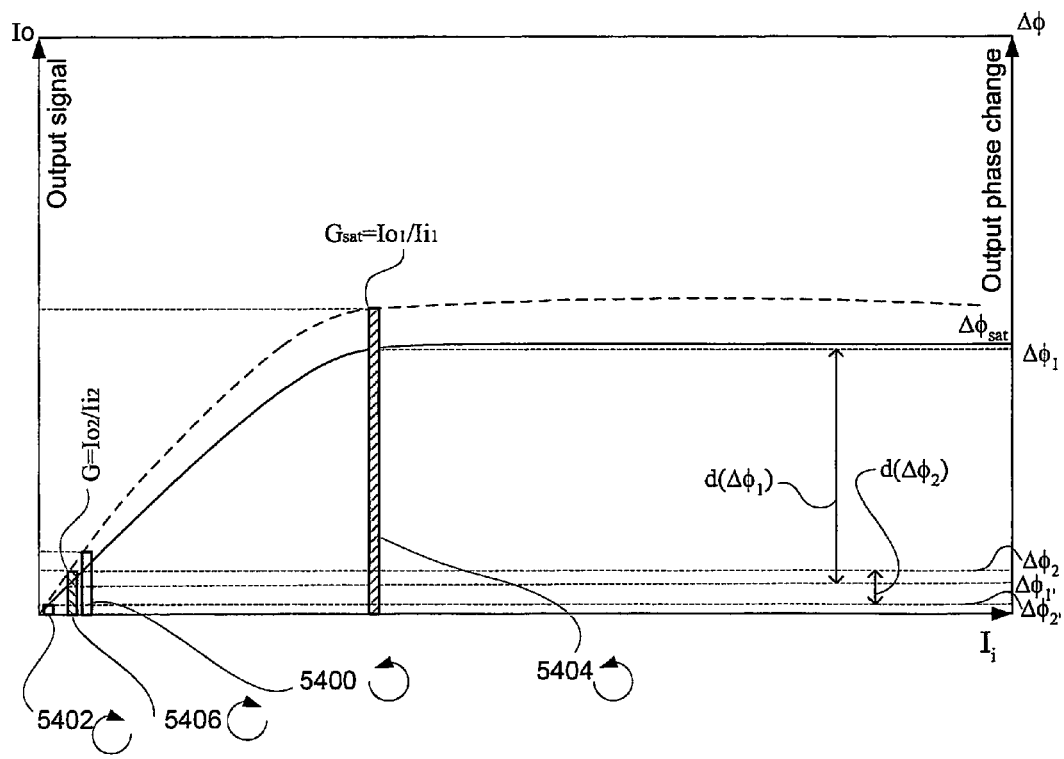
Fig. 5

OPTICAL SWITCH AND GATE APPARATUS AND METHOD

REFERENCE TO OTHER APPLICATIONS

The present invention claims the benefit of U.S. Provisional Patent Application Serial. No. 60/475,902, filed Jun. 5, 2003, entitled "All Optical Switch and Gate Apparatus and Method".

In addition, this application is a Continuation-In-Part of U.S. patent applications Ser. Nos. 10/640,035 (now U.S. Pat. No. 7.212,705) 10/640,018 (now U.S. Pat. No. 7,430,539), 10/640,017 (now U.S. Pat. No. 7,218,862), and 10/640,040 (now U.S. Pat. No. 6,956,998), all filed Aug. 14, 2003, entitled "All Optical Decoding Systems For Decoding Optical Encoded Data Symbols Across Multiple Decoding Layerst", "All Optical Decoding Systems For Optical Encoded Data Symbols", "All Optical Cross Routing Using Decoding Systems For Optical Encoded Data Symbols" and "Compact Optical Delay Lines", respectively, all of which claim the benefit U.S. Provisional Patent Application Ser. No. 60/405, 697, filed Aug. 22, 2002, entitled "Steaming Signal Control System for Digital Communication".

FIELD OF THE INVENTION

The invention relates to optical communication devices and systems and, more particularly, to optical gates and switches.

BACKGROUND OF THE INVENTION

In the field of optical communication, there is a need for fast transmission of large volume information. The optical fibers used today to carry the information in optical communication networks may be efficient in carrying large volume of information at high rates. Unfortunately, the transmission rate of the optical communication networks is not determined by the transmission rate of the optical fibers; rather, the transmission rate is determined by the switching rate of the switching devices in the networks. The switching devices used today are electronic switches that operate at relatively slow rates and are not fast enough to switch the information at higher desired rates, which can be carried by the optical fibers. Accordingly, the electronic switches used today are the bottleneck of the existing optical communication networks. In addition, the use of electronic switches requires the integration of Optical-Electrical-Optical (O-E-O) converters that are expensive.

SUMMARY OF THE INVENTION

It is an object of some exemplary embodiments of the present invention to provide All-Optical gates and switches.

It is another object of some exemplary embodiments of the present invention to provide fast All-Optical gates and switches.

It is yet another object of some exemplary embodiments of the present invention to provide All-Optical gates and switches that are activated by electronic signals.

It is still another object of some exemplary embodiments of the present invention to provide All-Optical gates and switches that are activated by optical signals.

In one version, exemplary embodiments of the present invention provide an optical switch including:

a threshold device having first, second and third terminals, the first terminal including a nonlinear element and a coupling device for coupling an activating signal from a fourth terminal into the first terminal, wherein the threshold device is arranged to receive an input signal at the first terminal and to produce an output signal at one of the second and third terminals in response to the activating signal.

In an alternative version, exemplary embodiments of the present invention provide an optical switch including:

an input and first and second outputs;

first and second signal guiding branches, each branch having first and second terminals, at least one of the first and second branches comprising a non-linear optical element and one of the first and second branches including a coupling device for coupling an activating signal from an activating terminal into one of the first and second branches;

first and second optical couplers, at least one of the first and second optical couplers comprising an asymmetric optical coupler, the first optical coupler configured to split an input signal from the input into a first signal portion propagating through the first branch and a second signal portion propagating through the second branch, wherein the second optical coupler configured to combine the first and second signal portions from the second terminals of the first and second branches, respectively, thereby to produce an output signal at one of the first and second outputs in response to the activating signal.

In an alternative version, exemplary embodiments of the present invention provide an optical switch including:

a splitting device having first, second, third and fourth terminals;

a nonlinear element;

an attenuator; and an optical loop associated with the third and fourth terminals, the optical loop including the attenuator and the nonlinear element, the nonlinear element being displaced from a mid-point of the optical loop, wherein the splitting device is able to receive an input signal via one of the first and second terminals and an activating signal via one of the first and second terminals, and to provide an output signal at one of the first and second terminals in response to the activating signal.

In an alternative version, exemplary embodiments of the present invention provide an optical switch including:

a splitting device having first second third and fourth terminals;

a nonlinear element;

a coupling device; and an optical loop associated with the third and fourth terminals, the optical loop including the nonlinear element, displaced from a mid-point of the optical loop, and the coupling device, which is able to produce loss in the optical loop and to couple a continuous wave activating signal from an activating terminal into the nonlinear element, wherein said splitting device is arranged to receive an input signal via one of said first and second terminals and to provide an output signal at one of said first and second terminals in response to said continuous wave activating signal.

BRIEF DESCRIPTION OF THE DRAWINGS

The present invention will be understood and appreciated more fully from the following detailed description of embodiments of the invention, taken in conjunction with the accompanying drawings in which:

FIG. 4a is a schematic illustration of a threshold device according to exemplary embodiments of another aspect of the present invention, including a nonlinear optical loop structure;

FIG. 4b is a schematic illustration of an exemplary attenuator design that may be used in conjunction with the threshold device of FIG. 4a;

FIG. 4c is a schematic illustration of an exemplary circulator design that may be used in conjunction with the threshold device of FIG. 4a;

FIG. 5 is a schematic illustration of a graph depicting relative phase shift and intensity of output signals produced by a NLE according to exemplary embodiments of the invention in response to input signals of two different amplitudes, showing two pulses propagating in opposite directions for each amplitude;

DETAILED DESCRIPTION OF EMBODIMENTS OF THE INVENTION

Figure 1A:
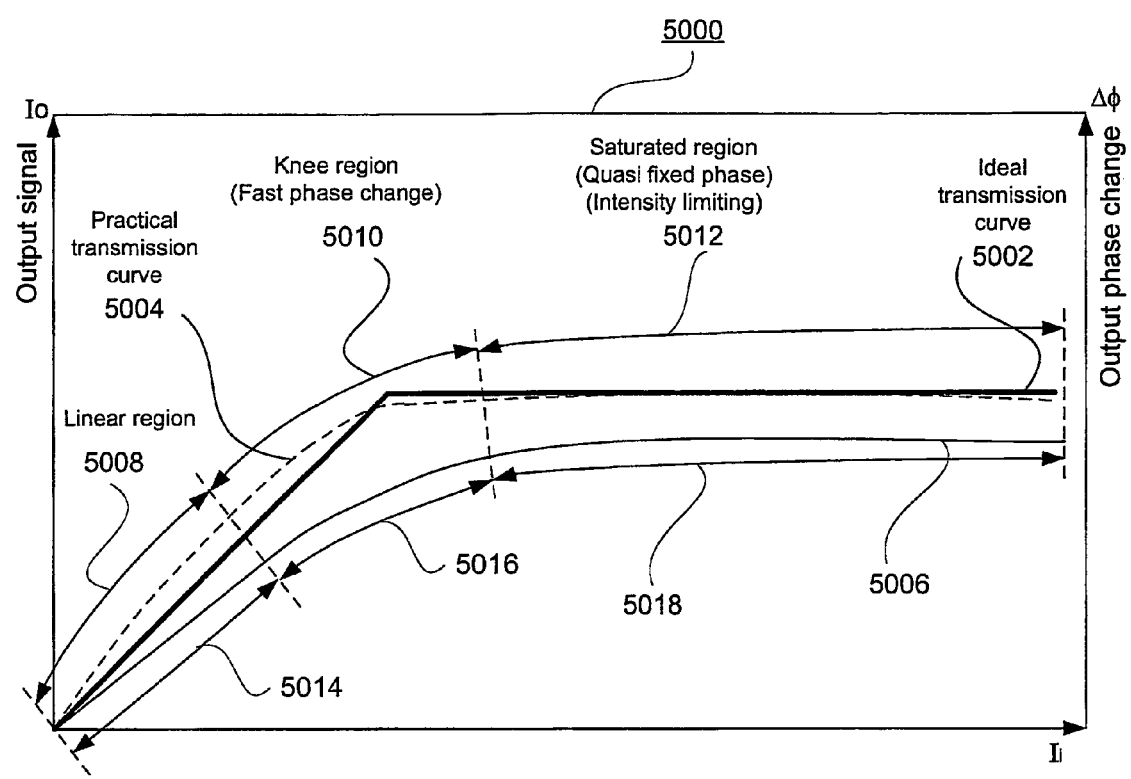
FIG. 1a is a schematic illustration of a graph showing relative phase shift and intensity of output signals of a Non Linear Element (NLE) as a function of signals input to the NLE.

FIG. 1a schematically illustrates a graph 5000 having coordinates of output intensity Io and output relative phase change $\Delta\phi$ versus input intensity Ii. Graph 5000 depicts ideal and practical transmission curves 5002 and 5004, respectively, illustrating the relationship between output and input intensities, Io and Ii, respectively, of a nonlinear medium, e.g., a Non-Linear Element (NLE) such as, for example, an optical amplifier, an Erbium Doped Fiber Optic Amplifier (EDFA), a Solid state Optical Amplifier (SOA), a Linear Optical amplifier (LOA), an optical limiter, or any other suitable nonlinear device or material. Curve 5006 schematically illustrates the relationship between the output phase change $\Delta\phi$ and the input intensity Ii in optical devices such as, for example, the above-mentioned amplifiers, limiters, or nonlinear media.

As shown in FIG. 1a, curve 5004 has a linear region 5008, a nonlinear knee region 5010, and a quasi-flat saturation region 5012. For relatively low level input signals Ii, in range 5008, the corresponding output signals Io are substantially linearly proportional to the input signal Ii. For intermediate levels of input signals Ii, e.g., in range 5010, the output signals Io are no longer linearly proportional to the input signals. For relatively high-level input signals Ii, e.g., in the range 5012, the output signals Io are saturated, generally fixed, and independent of the intensity of the input signals Ii.

Curve 5006 shows a phase change $\Delta\phi$, which may correspond to a change of the refractive index $\Delta N$, at the output of the non-linear device. The phase change $\Delta\phi$ depends on the change of the refractive index $\Delta N$, the wavelength $\lambda$, and the length of the amplifier/limiter L. The phase change may be given by:

$$\Delta\phi = 2\pi/\lambda \cdot \Delta N \cdot L \qquad (1)$$

Thus, for fixed values of wavelength $\lambda$ and length L, the phase change $\Delta\phi$ may be linearly proportional to the change of the refractive index $\Delta N$.

At the range of low-level input signals, the output phase change $\Delta\phi$ depends linearly on the input signals Ii as indicated by range 5014, which corresponds to intensity range 5008. At the range of medium level input signals, the change of $\Delta\phi$ is a sub-linear function of the input intensities Ii, as indicated by range 5016 which corresponds to intensity range 5010. At the range of relatively high input signals, the output phase shift $\Delta\phi$ is saturated and is almost fixed and does not depends on the input intensities Ii, as indicated by range 5018, which corresponds to intensity range 5012.

Figure 1B:
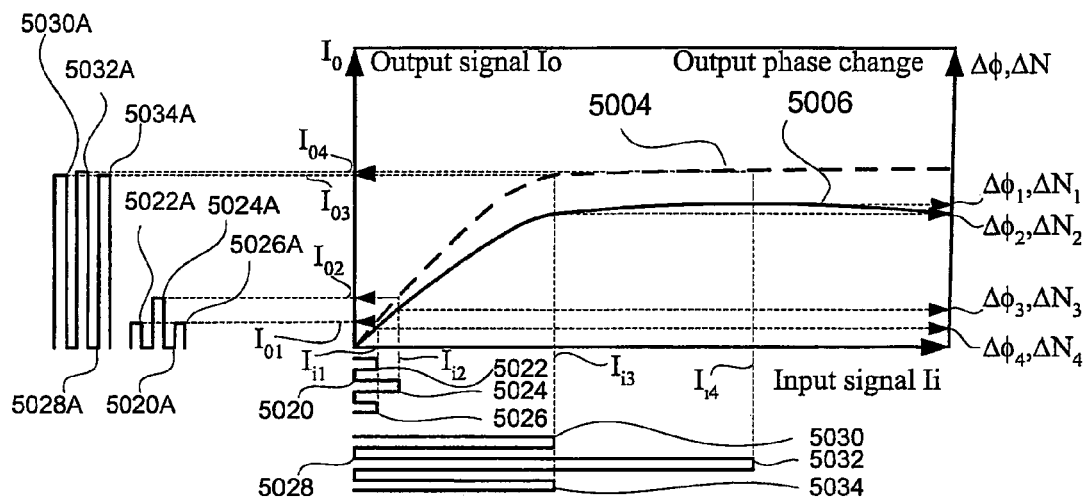
FIGS. 1b and 1c are schematic illustrations of relative phase shifts and output signal intensities as in the graph of FIG. 1a, as applied to different input pulse patterns.

FIG. 1b schematically re-illustrates transmission curve 5004 of FIG. 1a, where with exemplary output signals Io versus input signals Ii are indicated, as well as curve 5006 of FIG. 1a, where exemplary output phase changes $\Delta\phi$ versus inputs signals Ii are indicated. FIG. 1b further illustrates the relationship between exemplary input signal patterns, 5020 and 5028, and their corresponding output signal patterns, 5020A and 5028A. In analyzing FIG. 1b and FIG. 1c for two different types of input signals, namely, low-level input signals within the linear range of the NLE (e.g., ranges 5008 and 5014 of FIG. 1a) and high-level input signals within the saturation range of the NLE (e.g., ranges 5012 and 5018 of FIG. 1a), the following observations are made:

Input signal pattern 5020 is a low level input signal and the pulses of signal 5020 (i.e., pulses 5022 and 5026 and pulse 5024), having intensities $Ii_1$ and $Ii_2$, respectively, are within range 5008 (or 5014) of FIG. 1a. Thus pulses 5022, 5024 and 5026 are transmitted linearly according to curve 5004, resulting in output signal pattern 5020A having intensities $Io_1$ and $Io_2$, respectively. The pulses of signal 5020A (i.e., pulses 5022A, 5024A and 5026A) are also within the linear range 5014 (or 5008) of FIG. 1a and are, thus, transmitted linearly according to curve 5006. As shown in FIG. 1b, the lower amplitude pulses 5022A and 5026A have a phase shift $\Delta\phi_1$ and the higher amplitude pulse 5024A has a phase shift of $\Delta\phi_2$. Since the pulses 5022A, 5024A and 5026A are all with low amplitudes, the phase shifts $\Delta\phi_1$ and $\Delta\phi_2$ are both very small. The difference $\Delta\phi_1 - \Delta\phi_2$ is even smaller and may be ignored for the purpose of the present invention. Accordingly, for the purpose of the present invention, the pulses 5022A, 5024A and 5026A of pattern 5020A may be considered to have substantially the same phase shift Δϕ.

Input signal pattern 5028 represents an intensity amplification of signal pattern 5020. The pulses of signal 5028 (i.e., pulses 5030 and 5034 and pulse 5032), have intensities $Ii_3$ and $Ii_4$, respectively, and are within the high level, i.e., saturated, intensity range 5012 (or 5018) of FIG. 1a. Thus, pulses 5030, 5032 and 5034 are transmitted according to curve 5004 with quasi-equal intensities $Io_3$ and $Io_4$, and quasi-equal phase shifts $\Delta\phi_3$ and $\Delta\phi_4$, resulting in output pulses 5030A, 5032A and 5034A, respectively, of output signal pattern 5028A.

Figure 1C:
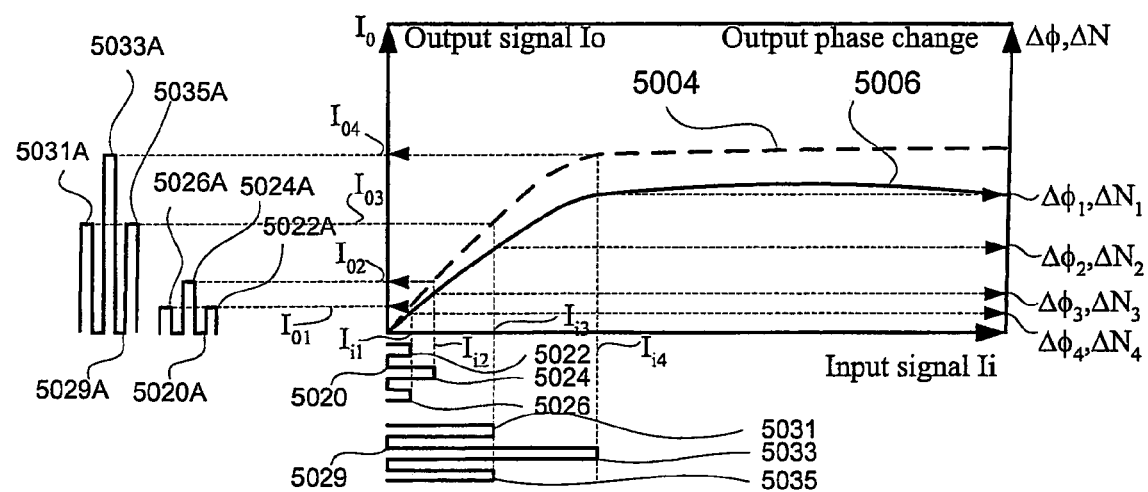

FIG. 1c schematically illustrates a graph similar to that of FIG. 1b, showing the same input and output patterns 5020 and 5020A; however, instead of amplified pattern 5028, FIG. 1c illustrates transmission of an input pattern 5029, which is produced by a lower amplification of input pattern 5020 than that of pattern 5028. Due to the lower amplification of pulse pattern 5020, only the higher amplitude 5033 of pattern 5029 has an intensity $Ii_4$ in the saturated region 5012 (or 5018) of FIG. 1a. However, the intensity $Ii_3$ of the other amplitudes, namely, the intensity of amplitudes 5031 and 5035, is within the linear region 5008 (or 5014) of FIG. 1a. Accordingly, the non-linear device applies a lower effective amplification factor to amplitude 5033 compared to the amplification factor applied to amplitudes 5031 and 5035, and results is larger phase difference, $\Delta\phi_4-\Delta\phi_3$, between the output pulse 5033A and output pulses 5031A and 5035A of output pattern 5029A, respectively.

I. Optical Threshold Devices Using an Adaptation of a Non-Linear MZI

Figure 2A:
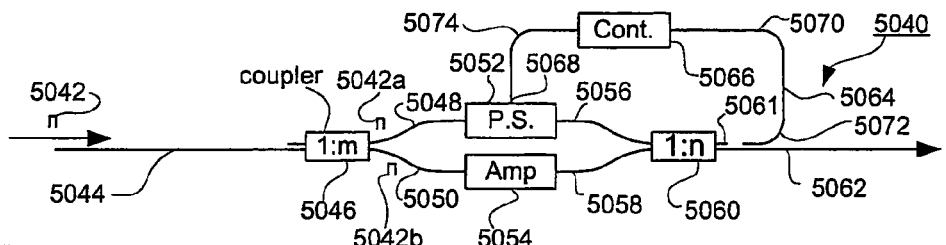
FIGS. 2a-2d are schematic illustrations of four exemplary designs of threshold devices according to exemplary embodiments of one aspect of the present invention, using an adaptation of a non-linear MZI.

FIG. 2a schematically illustrates a threshold device 5040 according to exemplary embodiments of one aspect of the present invention. The device illustrated in FIG. 2a may include a continuous sequence of optical components connected by light guiding media such as, for example, optical fibers, planar waveguides, or planar circuits (PLC) that may be fabricated using integrated optic techniques and/or on-chip manufacturing. Alternatively, device 5040 may be constructed from discrete components, in which case the optical fibers may be replaced by open space and the directional couplers, discussed below, may be replaced by beam splitters. A low level input pulse 5042 may propagate through input terminal 5044 of an asymmetric directional coupler 5046 having an amplitude splitting ratio of 1:m, wherein m may be any positive number). Coupler 5046 may split pulse 5042 into two pulses, 5042a and 5042b, which may propagating in separate output branches, 5048 and 5050, respectively. The normalized amplitudes of pulses 5042a and 5042b in branches 5048 and 5050 are thus m and 1, respectively, in relative units as defined herein. Pulse 5042a may propagate through phase shifter 5052 and may enter a directional coupler 5060 via an input branch 5056. Pulse 5042b may propagate through amplifier 5054 and may enter coupler 5060 via an input branch 5058. Phase shifter 5052 may be adjusted to produce a phase shift Δϕ to ensure that pulse 5042a destructively interferes with pulse 5042b at an output port 5062 of coupler 5060. The amplitude gain G of amplifier 5054 may be adjusted to maintain an amplitude magnitude of pulse 5042b, at input branch 5058 of coupler 5060, that will cause pulses 5042a and 5042b to null each other by the destructive interference between them at output port 5062 of coupler 5060.

The phase shift Δϕ produced by phase shifter 5052 may ensure that pulses 5042a and 5042b enter coupler 5060 with a phase difference of π/2 radians. This means that Δϕ may compensate for the differences in optical paths caused by the differences between branches 5048 and 5050, the terminals of coupler 5046 and 5060, and the phase shift of amplifier 5054, which may include a SOA, LOA, or EDFA, as are known in the art, such that the relative phase between pulses 5042a and 5042b at output port 5062 of coupler 5060 will be π radians. At the same time, input ports 5058 and 5056 of combiner 5060 contribute their amplitudes to output port 5062 in a ratio of 1:n, wherein n represents any positive number, respectively, to produce equal amplitude pulses with opposite phases. When the required conditions for Δϕ and the amplitudes are maintained, the amplitude at port 5062 may be given by:

$$I_{5062}=1\times G-m\times n=0 \qquad (2)$$

To assure that $I_{5062}$ will be zero, the amplification G of amplifier 5054 should be equal to mxn when n is the splitting/combining ratio of coupler 5060. Accordingly, in embodiments of the invention, both couplers 5046 and 5060 may be asymmetric couplers, wherein m, n≠1 and mxn=G). Alternatively, one of couplers 5060 and 5046 may be an asymmetric coupler while the other coupler may be a symmetric coupler, wherein either n=1 and m≠1 or m=1 and n≠1 and mxn=G. For example, when coupler 5060 is a symmetric coupler (i.e., n=1), gain G may be equal to m.

To compensate for possible changes in the relative phases of pulses 5042a and 5042b in coupler 5060 due to influence by external parameters, for example, environmental temperature changes, the relative phase may be controlled by a closed loop 5070 that may control phase shifter 5052 to maintain the proper phase shift Δϕ. A coupler 5072 may tap a fraction of the intensity from port 5062 into optical guide 5064, which may transmit the tapped light to a controller 5066, which may monitor the tapped light and produce a corresponding electronic control signal that may be sent via lead 5074 to electrode 5068. The electronic control signal may be used as feedback for adjusting phase shifter 5052. For the range of low-level input signal 5042, the output signal at port 5062 should be substantially zero. A substantially zero-level output may be maintained by closed loop control 5070 by adjusting shifter 5052 using controller 5066.

In embodiments of the invention, closed loop 5070 maintains the desired steady state phase relationship between the signals at ports 5056 and 5058, respectively. The response time of closed-loop phase control 5070 may be considerably longer than the time duration of the signals propagating in device 5040 and thus, the dynamic influence of loop 5070 on the phases of these signals may be negligible. To maintain the above mentioned steady-state conditions by sampling short-duration optical signals, controller 5066 may monitor and average the tapped light, e.g., by integration over a predefined range, producing an electronic control signal corresponding to the average of the optical signals, as tapped, arriving at optical guide 5064 from coupler 5072.

In the range of low-level input signals, the change of the phases produced by amplifier 5054 is small and there is no change in the amplifier gain G. This means that while gain G and phase shift Δϕ of threshold device 5040 may be adjusted to produce a zero-level output signal for inputs at a certain low level amplitude, the amplifier actually maintains an output signal level of substantially zero in a range of low-level input intensities that includes the specific intensity for which device 5040 is adjusted to produce the zero-level signal. The range of low-level input intensities may be defined as the range of amplitudes below a certain amplitude level for which the threshold device may be designed to yield substantially zero-level output signals.

The magnitude of the amplitude for which the threshold device is designed to yield a zero-level output may be determined by the values of gain G and phase shift $\Delta\phi$. For amplitudes significantly higher than the above discussed low-level inputs, as discussed below with reference to FIG. 2b, gain G may be reduced to a saturated value $G_{sat}$ and the phase shift $\Delta\phi$ may be increased to a saturated value $\Delta\phi_{sat}$, i.e., the requirement for Equation 2 above are not fulfilled. Instead, in the range of high-level input signal, device 5040 may transmit the signals at a non-zero output level, which may be given by:

$$I_{5062}=1\times G-m\times n\neq 0 \quad (3)$$

Thus, the gain G and the phase shift $\Delta\phi$ may control the "turn on" point of the threshold device. The "turn on" (e.g., threshold) point may be defined as a point on the axis of input amplitudes (intensities) at which the transmission function of the threshold device, i.e., the output signal as a function of the input signal, begins to increase sharply.

Figure 2B:
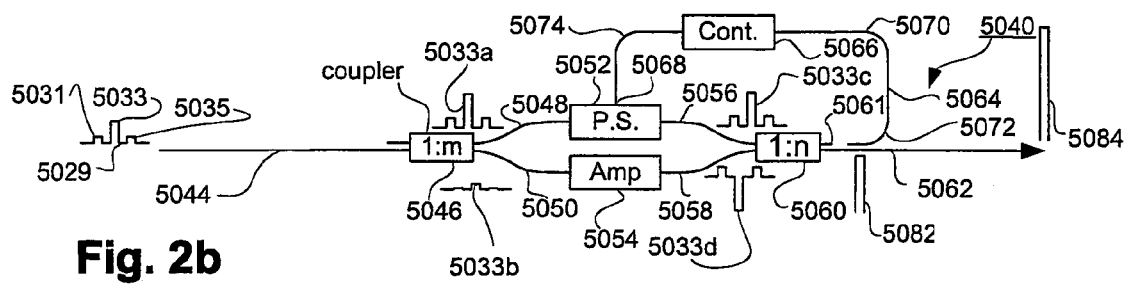

FIG. 2b illustrates threshold device 5040, as in FIG. 2a, but describes operation of device 5040 for both low and high level ranges of input signals that may be carried by input pulse pattern 5029. The input pattern signal 5029 may be as illustrated in FIG. 1c, i.e., it may include lower level pulses 5031 and 5035 with magnitudes within the linear range of amplifier 5054 and a higher-level pulse 5033 with a magnitude in the saturation range of amplifier 5054. Lower level pulses 5031 and 5035 of input pattern 5029 may have amplitudes substantially the same or similar to the amplitude of pulse 5042 in FIG. 2a. Accordingly, as explained above with reference to pulse 5042 of FIG. 2a, there would be substantially no output signal at port 5062 of device 5040 in response to input pulses 5031 and 5035. It will be appreciated that the above discussion relating to lower level input pulse 5042 is also applicable to lower level input pulses 5031 and 5035 in FIG. 2b.

In contrast to the low-level pulses, pulse 5033 may be split by coupler 5046 into two pulses, 5033a and 5033b, propagating along branches 5048 and 5050, respectively. The amplitude of pulse 5033a may be about in times higher than the amplitude of pulse 5033b; however, the amplitude of pulse 5033b is still in the saturation range of amplifier 5054. As explained above, in the saturation range, the gain $G_{sat}$ of amplifier 5054 may be much lower than gain G in the linear region. This means that, in the range of high-level input signals, the ratio between the amplitudes of pulses 5033d and 5033c, carried by input branches 5058 and 5056 of coupler 5060, respectively, may be much smaller than the ratio between these pulses in the range of low-level input signals. Accordingly, in contrast to the ratio maintained between pulses 5033d and 5033c to substantially null the output signal at port 5062 for the low-level input signals, the ratio between pulses 5033d and 5033c for the high-level input signals may be changed to a value which results in a significantly non-zero output signal at port 5062. In addition, the phase shift produced by amplifier 5054 in the saturated region may be much higher than the phase shift produced by the amplifier in the linear region. It can be seen from Equation 1 that the phase difference between pulses 5033c and 5033d at inputs 5056 and 5058 of coupler 5060, respectively, may be reversed, e.g., from the value of $\pi/2$ radians for low-level signals to a value of $-\pi/2$ radians for the high-level signals, by appropriate selection of the length L of amplifier 5054. The phase difference between pulses 5033c and 5033d at inputs 5056 and 5058 of coupler 5060 may also be adjusted by adjusting the excitation level of amplifier 5054, which may determine the saturation level of the amplifier. Changing the polarity of the relative phase shift between pulses 5033c and 5033d, from a positive value at low-level signals to a negative value at high-level signals, results in a change from destructive interference to constructive interference, respectively, between pulses 5033c and 5033d, at port 5062. This means that for low-level input signals, the output signals at port 5062 may "cancel out" by destructive interference, while the high-level input signals may interfere constructively to produce non-zero output signals at port 5062. Therefore, in this case, the phase difference between the pulses at the input terminals of coupler 5060 may be opposite the phase difference between the same terminals in the case of lower level input amplitudes (e.g., pulse 5042 of FIG. 2a or pulses 5031 and 5035 of FIG. 2b).

It should be note that, even if the phase difference between pulses 5033c and 5033d is not reversed, the output signal at output port 5062, i.e., the expression $I_{5062}=(1\times G_{sat}-m\times n)$ may not be zero because $G_{sat}$ may not be equal to mxn. In addition, the phase difference between pulses 5033c and 5033d may be reversed, e.g., pulse 5033d may be drawn "upside down" relative to pulse 5033c, to indicate a reverse phase polarity, as schematically illustrated in FIG. 2b. Thus, for high-level input signals, the intensity at output port 5062 may be produced by constructive interference, rather than by destructive interference, when operating on low amplitude level signals. Accordingly, in the case of relatively high level input signals, an output signal 5082 at output port 5060 may be significantly different from zero and may be given by: $I_{5062}=1\times G_{sat}+m\times n\neq 0$, where $G_{sat}$ is the amplitude gain at the saturated region of amplifier 5054.

In embodiments of the invention, output signal 5082 may be further amplified to any desired intensity to produce a stronger signal, represented by pulse 5084.

Figure 2C:
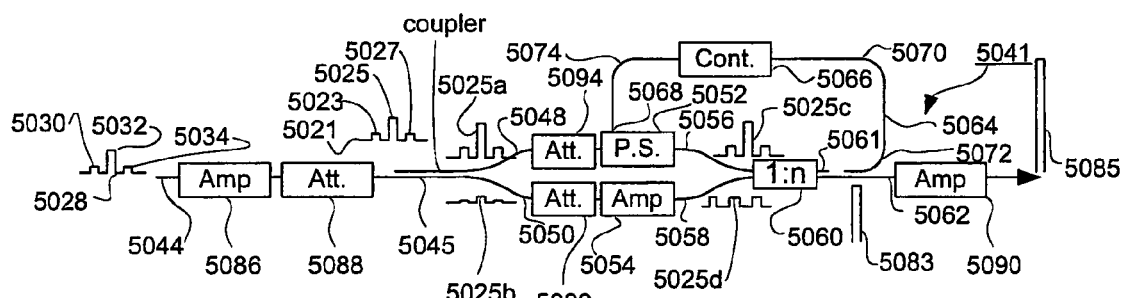

FIG. 2c illustrates a threshold device 5041, which is an exemplary variation of the threshold device 5040 illustrated in FIGS. 2a and 2b. In this variation, the 1:m directional coupler 5046 of FIGS. 2a and 2b is replaced with a symmetric directional coupler 5045 and the 1:m ratio between the amplitudes at branches 5050 and 5048, respectively, may be obtained by appropriately different attenuation of the two branches, e.g., using different attenuators 5092 and 5094, respectively.

Device 5040 of FIGS. 2a and 2b and device 5041 of FIG. 2c are described in accordance with two different operational design requirements. It should be appreciated, however, that appropriate adjustment of parameter settings in device 5041 may produce the threshold operation described above with reference to device 5040, and vice versa, as well as other threshold operations not explicitly described herein.

In device 5040 of FIGS. 2a and 2b, the output signals for higher level input signals are controlled by the gain and phase changes produced by amplifier 5054 when it is operated in the saturated region. In device 5041 of FIG. 2c, in contrast, the signals for the higher-level input signals may be controlled only by the change in the gain of amplifier 5054 when it is operated in its a deeply saturated range.

The input pulse pattern in the embodiment of FIG. 2c may be of a type such as pattern 5028 of FIG. 1b, i.e., of the type in which both the lower level input pulses 5030 and 5034 and the higher level input pulse 5032 are in the saturated range of amplifier 5054. To produce such an input, an amplifier 5086 may be used in conjunction with a variable attenuator 5088 to produce an amplifier with variable gain, whereby the input gain may be adjusted to convert pattern 5028 into the type of pattern 5021, which includes low-level pulses 5023 and 5027 and high amplitude pulse 5025. After amplification and attenuation (hereinafter: "net amplification") of input pattern 5028 into pattern 5021, if such amplification is needed, pattern 5021 may be split by coupler 5045 into pulses 5025a and 5025b, propagating in branches 5048 and 5050, respectively. In embodiments of the invention, the relative attenuations of attenuators 5092 and 5094 may be set to produce an amplitude ratio of 1:m between the signals at branches 5050 and 5048, respectively. The pulse pattern at branch 5050 may pass through amplifier 5054 when the lower level pulses have amplitudes within the saturation region of amplifier 5054. Thus, the pulse pattern may arrive at input 5058 of coupler 5060 with a gain of G' and with, e.g., the maximum possible phase shift that amplifier 5054 can produce. The pulse pattern at branch 5048 passes through phase shifter 5052 and may arrive at input 5056 of coupler 5060 with a phase shift as produced by phase shifter 5052, which may be adjusted to produce appropriately destructive interference between interfering pulses from inputs 5056 and 5058 at output 5062. In addition, the ratio of 1:m may be adjusted such that m may be equal to G'/n. Accordingly, the output signal for lower-level input signals of device 5041 may be given by: $I_{5062}=1\times G'-m\times n=0$, where n is the splitting ratio of coupler 5060. For example, if coupler 5060 is a symmetric coupler (n=1), then G' may be equal to m.

With higher-level input signals, such as pulse 5032 of pattern 5028, the operation of device 5041 may be generally similar to its operation with lower-level input signals, except for a different gain of amplifier 5054. Since higher-level pulse 5025b is significantly within the saturated region, the gain of amplifier 5054 for this signal, G", may be different from gain G'. However, the phase shift produced by amplifier 5054 for pulse 5025b may be the same as the phase shift produced for the lower level pulses, and may be the maximum possible phase shift. Accordingly, high-level pulses 5025d and 5025c from inputs 5058 and 5056, respectively, may interfere destructively at output port 5062 as in the case described above of low-level pulses. However, in the case of high-level pulses, in accordance with embodiments of the invention, pulse 5025d may be amplified by amplitude gain G", which may be significantly lower than G', whereby output signal 5082 may be significantly different from zero and may be given by:

$$I_{5062}=1\times G''-m\times n=G''-G'\neq 0.$$

Since, for higher-level input signals, device 5041 does not rely on phase inversion to produce an output signal 5083, in such a situation, the amplitude of the output signal may be smaller than the amplitude of output signal 5082 discussed above with reference to FIG. 2b. Accordingly, amplifier 5090 may be used to enhance pulse 5083 and, thereby, to produce a higher amplitude signal 5085.

In analogy to the control of the "turn on" point discussed above with reference to device 5040, the "turn on" point of device 5041 may also be adjusted by varying the values of the amplifier length L, the splitting ratios m and n and the saturated level of amplifier 5054, and/or by adjusting gains G' and G". The saturation level of amplifier 5054 may be varied by changing the excitation level of the amplifier, e.g., by adjusting optical pumping power in the case of EDFA and LOA, or by adjusting current injection level in the case of SOA. Accordingly, by adjusting the above mentioned parameters, e.g., the values of m, n, G', G", and the excitation level, it is possible to determine the amplitude for which the following equations are fulfilled:

$$I_{5062}=1\times G'-m\times n=0 \text{ and } I_{5062}=1\times G''-m\times n=G''-G'\neq 0 \quad (4)$$

The amplitude deduced from the value of G' in Equations 4 may be defined as the "turn on" point of device 5041.

Figure 2D:
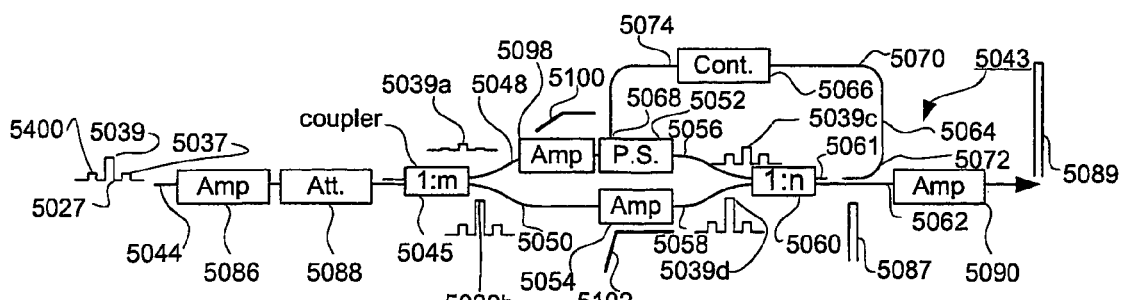
Figure 3A:
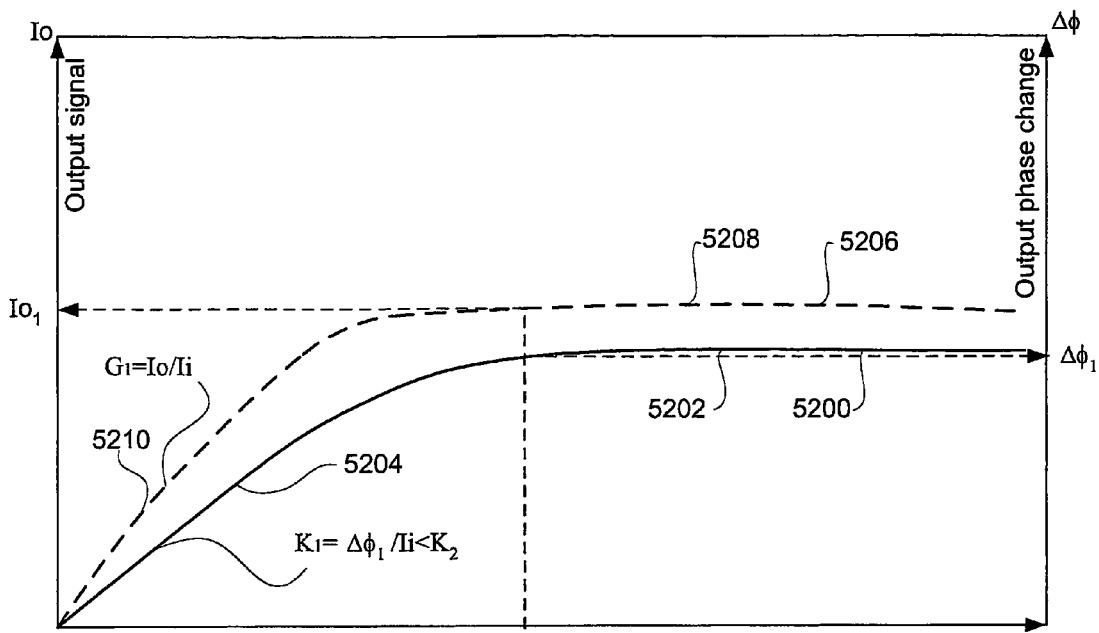
FIGS. 3a and 3b are schematic illustrations of the transmission functions of output intensities and phase shifts versus input intensities for an optical amplifier according to exemplary embodiments of the present invention at different excitation levels.
Figure 3B:
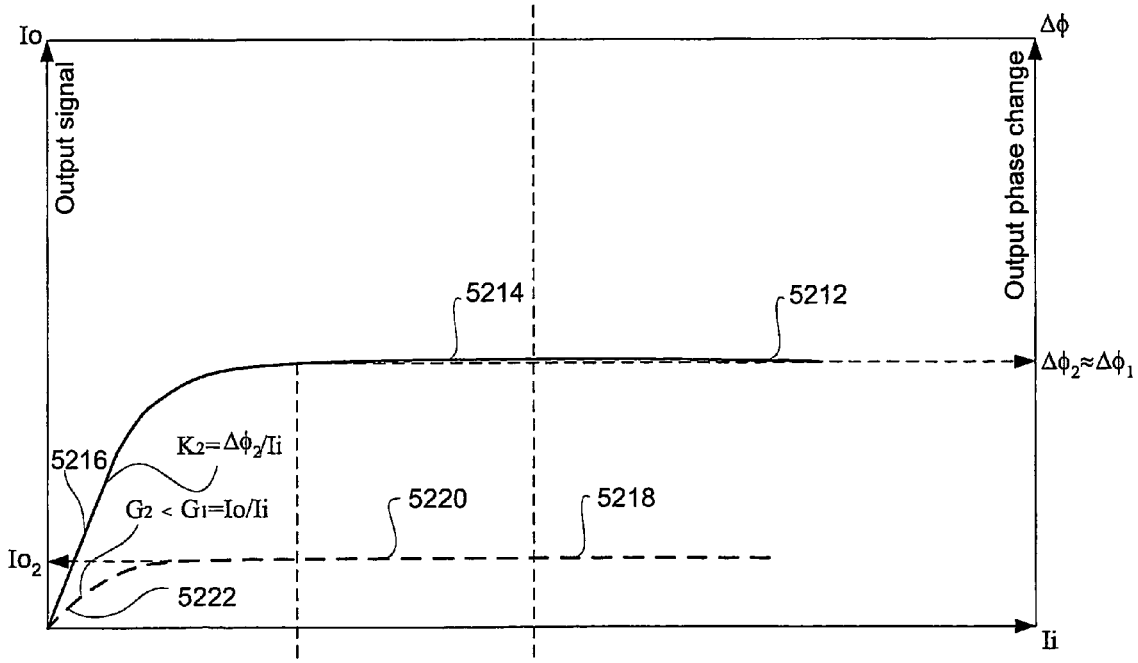

Reference is now made to FIGS. 2d, 3a, and 3b. FIG. 2d illustrates threshold device 5043 in accordance with further exemplary embodiments of the present invention. FIGS. 3a and 3b illustrate the amplitude and phase transmission functions of a NLE (e.g., SOA, LOA, or EDFA) of device 5043 for two, respective, excitations levels. The threshold device 5043 in accordance with the embodiment of FIG. 2d may have a structural design generally similar to the structural design of device 5041 of FIG. 2c, with the following differences. In the component structure of the device, attenuator 5092 of FIG. 2c is removed and attenuator 5094 of FIG. 2c is replaced by an amplifier 5098. Additionally, device 5043 may be designed to operate in accordance with two different modes as detailed below.

In the first mode of operation of device 5043, couplers 5045 and 5060 may be symmetric couplers (e.g., m=1, n=1). Amplifiers 5054 and 5098 may be generally identical; however, the excitation level (e.g., optical pumping or current injection level) of amplifier 5098 may be lower than the excitation level of amplifier 5054. Thus amplifier 5098 may have a lower saturation level. The transmission functions and the saturation levels of amplifiers 5098 and 5054 are depicted denoted by symbols 5100 and 5102, respectively. Lower input pulses 5400 and 5037 and high-level pulse 5039 of input signal pattern 5027 may be amplified and attenuated by amplifier 5086 and attenuator 5088, respectively, to produce a variable input gain, if necessary. Lower input pulses 5400 and 5037, which may be split by splitter 5045 into branches 5048 and 5050, may be amplified and their phase may be shifted by amplifiers 5098 and 5054. Phase shifter 5052 may control the phase of pulses within the range of lower level amplitudes such that the pulses enter port 5056 in a phase that ensures a desired destructive interference at port 5062. In this design, lower-level pulses substantially cancel each other out at output port 5062, resulting in a zero-level output signal from coupler 5060. Higher-level input pulse 5039 may also be split by splitter 5045 into pulses 5039a and 5039b, propagating along branches 5048 and 5050, respectively. Pulse 5039b may be amplified by amplifier 5054 to produce pulse 5039d. Pulse 5039a may be amplified by amplifier 5098, which may have a saturation level lower than the saturation level of amplifier 5054 and, thus, may already be saturated at the amplitude magnitude of pulse 5039a. Accordingly, the amplitude of pulse 5039c that is produced by amplifier 5098 is smaller than the amplitude of pulse 5039d produced by amplifier 5054. The difference between the amplitudes of pulses 5039d and 5039c is enough to produce a significantly non-zero output signal at port 5062. In addition, the phase shift of pulse 5039c, which may be in the saturated region of amplifier 5098, may be greater than the phase shift of pulse 5039d, which may be in the linear region of amplifier 5054. In this scenario, the different shifts of the phases of pulses 5039c and 5039d further enhance output signal 5087, for higher level input signal, because the interference at port 5062 may not be perfectly destructive. Amplifier 5090 may be used to enhance pulse 5087 and, thereby, to produce a higher amplitude signal 5089.

FIGS. 3a and 3b illustrate transmission functions of output intensity, Io, and output phase shift, $\Delta\phi$, versus input intensity, Ii, corresponding to amplifiers 5054 and 5098, respectively. Solid line 5200 in FIG. 3a, which corresponds to amplifier 5054, illustrates the output phase shift $\Delta\phi$ versus the input intensity Ii with saturated and linear regions, 5202 and 5204, respectively. Broken line 5206 in FIG. 3a illustrates the output intensity Io versus the input intensity Ii of amplifier 5054 with saturated and linear regions, 5208 and 5210, respectively. Similarly, solid line 5212 in FIG. 3b, which corresponds to amplifier 5098, illustrates the output phase shift $\Delta\phi$ versus the input intensity Ii with saturated and linear regions, 5214 and 5216, respectively. Broken line 5218 of FIG. 3b illustrates the output intensity Io versus the input intensity Ii of amplifier 5098 with saturated and linear regions, 5220 and 5222, respectively.

It can be seen that amplifier 5054 with the higher excitation has a gain slope $G_1$ that is steeper than the gain slope $G_2$ of amplifier 5098 with the lower excitation. On the other hand, the slope of the phase shift, $K_1$, in amplifier 5054 is less steep than the slope of the phase shift, $K_2$, in amplifier 5098. This means that even if amplifiers 5054 and 5098 are designed to be identical, the different excitation levels of the two amplifiers result in different gains and different phase shifts for the two amplifiers. Accordingly, device 5043 may operate in a mode that produces an output signal in response to higher-level input signals, when amplifier 5098 is saturated and amplifier 5054 is not saturated, resulting in the two amplifiers having different gains and phase shifts. When device 5043 receives at its input 5044 signals in the range of lower level amplitudes, the resultant signals at branches 5056 and 5058 may cancel each other out at output port 5062. However, since amplifiers 5054 and 5098 have different gain slopes, $G_1$ and $G_2$, respectively, and different phase shift slopes, $K_1$ and $K_2$, respectively, the resultant signals at terminals 5056 and 5058 have different gains and phase shifts, as explained above, even in the range of lower level input signals. Accordingly, while in the lower range amplifiers 5054 and 5098 compensate for each other's results, their mutual compensation may not be accurate and the signals of branches 5056 and 5058 may not completely cancel each other out at port 5062 to produce zero-level (or close to zero-level) signals across the range of lower level input signals.

An improvement to the performance of device 5043, in a second mode of operation, may be achieved by using asymmetric couplers 5045 and 5060 to produce substantially zero-level output signals across the range of lower-level inputs. In the second mode of operation of device 5043 of FIG. 2d, asymmetric couplers may be used for couplers 5045 and 5060 instead of the symmetric couplers used in the first mode of operation of the design of device 5043 in FIG. 2c s above.

Coupler 5045 may receive input signals from terminal 5044 and may split them at a ratio of 1:m, where the larger split portion (m) is directed toward branch 5050, which leads to amplifier 5054 with the less steep phase shift slope $K_1$, and the smaller split portion (1) is directed toward branch 5048, which leads to amplifier 5098 with the steeper phase shift slope $K_2$. The ratio 1:m may be chosen to be similar to the ratio $K_1:K_2$. Thus, the product $1 \cdot K_2 = m \cdot K_1$ may be fulfilled, thereby assuring that substantially the same phase shift would be produced by both of amplifiers 5054 and 5098 across the range of lower level input signals, at least over the amplitude range in which amplifier 5098 is substantially linear.

Since, under the above conditions, amplifiers 5054 and 5098 produce substantially the same phase shift across the range of lower level input signals, phase shifter 5052 may be adjusted to maintain the relative phase shift between the pulses at branches 5056 and 5058 such that the pulses from the two branches may interfere destructively at output port 5062. However, maintaining the same phase shift for both amplifiers 5054 and 5098 requires that the smaller split amplitudes (fraction 1 from coupler 5045) be directed towards amplifier 5098 via branch 5048 with the lower amplitude gain $G_2$. At the same time, the larger split amplitudes (fraction m from coupler 5045) are directed toward amplifier 5054 via branch 5050 with the higher amplitude gain $G_1$. This means that the amplitudes with the smaller fraction (1) at terminal 5056 may be amplified by the smaller gain $G_2$, resulting in significantly smaller amplitudes than the amplitudes at terminal 5058 that are produced from the larger split fraction (m) amplified by the larger gain $G_1$.

To ensure that the amplitudes from terminals 5056 and 5058 are recombined with substantially equal amplitudes at output port 5062, combiner (directional coupler) 5060 may be asymmetric with a combining ratio of 1:n, where the larger n portion arrives at port 5062 via branch 5056 and the smaller 1 portion arrives to that port via branch 5058. In the range of low level input signals, the amplitude at port 5062 should be substantially zero and may be given by:

$$I_{5062} = 1 \cdot G_2 \cdot n - m \cdot G_1 19 \ 1 = 0 \qquad (5)$$

which may be reduced to: $G_2 \cdot n = m \cdot G_1$

For higher-level input signals, such as pulse 5039, amplifier 5098 may be saturated, its gain is reduced, and its phase shift is no longer equal to the phase shift of amplifier 5054. This results in a significantly non-zero output signal 5087 at output port 5062 because the interference in port 5062 in this scenario is not completely destructive and the condition that $G_2 \cdot n = m \cdot G_1$, derived from Equation 5, is no longer fulfilled.

From the above discussion, it is clear that the second design (mode) of device 5043, using asymmetric couplers 5045 and 5060, may be advantageous over the design using symmetric couplers because asymmetric design is clearly capable of maintaining the output signal 5087 at port 5062 at an amplitude of substantially zero across the entire range of lower level input signals.

In devices 5040, 5041, and 5043 of FIGS. 2a-2d, the "turn on" point in both the symmetric coupler design and the asymmetric coupler design, may be adjusted by adjusting the saturation level of amplifiers 5098 and 5045, e.g., by optical pumping or current injection. The excitation levels of amplifiers 5089 and 5045 may be different. Additional adjustable parameters that may determine the "turn on" point include gain G and the length L of amplifiers 5054 and 5098, the splitting ratios m and n of couplers 5045 and 5060, and the attenuation level of attenuators 5088, 5094 and 5092, which attenuation level may be different for each attenuator.

The "turn on" point of devices 5040, 5041 and 5043 may actually be a threshold level. For low-level input signals, e.g., in the range below the "turn on" threshold, the output signal may be strongly attenuated by destructive interference at the output ports of the devices. This may result in a transmission function between the input and the output of the devices including a generally monotonic range with a relatively shallow slope. For high-level input signals, e.g., in a range above the "turn on" threshold, the output signal at the output port of the devices may increase sharply, whereby the transmission function between the input and the output of these devices may include a range with a steep slope.

In some embodiments of the invention, the amplitude at branch 5050 may be attenuated by a factor of 1/n prior to entering branch 5058. In such embodiments, a symmetric (i.e., 1:1) coupler may be used instead of asymmetric (1:n) coupler 5060. Similarly, in some embodiments of the invention, asymmetric coupler 5045 (1:m) may be replaced by a symmetric coupler with additional attenuators, in analogy to the configuration of device 5041 in FIG. 2c where symmetric coupler 5045 is used in conjunction with attenuators 5092 and 5094.

In analogy to device 5040 of FIG. 2a, the devices 5040, 5041, and 5043 of FIGS. 2b, 2c, and 2d, respectively, may include a continuous sequence of optical components connected by light guiding media such as, for example, optical fibers, planar waveguides, or planar circuits (PLC), which may be fabricated using integrated optic techniques and/or on-chip manufacturing. Alternatively, devices 5040, 5041, and 5043 may be constructed from discrete components, in which case the optical fibers may be replaced by open space or a non-solid medium, e.g., a gas medium, and the directional couplers may be replaced by any suitable alternative components, e.g., beam splitters. It should be understood that, in embodiments of the invention, some or all of the couplers, amplifiers and/or attenuators used may include variable and/or adjusted components.

II. Optical threshold Devices Using an Adaptation of a Non-Linear Optical Loop

Reference is made to FIG. 4a, which schematically illustrates an optical threshold device, denoted 5300, in accordance with exemplary embodiments of another aspect of the present invention. Reference is also made to FIG. 4b, which schematically illustrates an attenuator 5314 that may be used in conjunction with exemplary embodiments of the device of FIG. 4a. The design of device 5300 may be beneficial because it is generally insensitive to the phase of the light signals and thus does not require a phase shifter or phase control. Device 5300 includes a symmetric directional coupler 5305 having an input terminal 5309 and an output terminal 5307. Input 5309 may be directly coupled, by coupler 5305, into input terminal 5304 of symmetric directional coupler 5302. Directional coupler 5302 has an additional output terminal 5306. Additional two terminals 5308 and 5310 of coupler 5302 may be connected to each other via a loop 5312 in a configuration similar to a loop mirror, as described below. Loop 5312 may include an amplifier 5316 and attenuator 5314. Amplifier 5316 may include any suitable type of amplifier, for example, a SOA, LOA, or EDFA. Attenuator 5314, which may be connected between connection points 5313 and 5315 on loop 5312, may include any suitable type of attenuator, for example, a Variable Optical Attenuator (VOA). It should be appreciated that the attenuators and/or VOA's used in conjunction with embodiments of the present invention may be implemented in the form of any type of device that causes attenuation of signals, including devices not conventionally used for attenuation purposes. For example, in some embodiments, an attenuation function may be implemented by an optical amplifier, e.g., a SOA, a LOA, or an EDFA, excited to levels at which the amplifier absorbs rather than amplifies input signals. In some exemplary embodiments, attenuator 5314 may include a fixed or variable coupler 5314A, connected between connection points 5313 and 5315, as illustrated schematically in FIG. 4b. The attenuation factor of attenuator 5314 may be adjustable and may depend on the fraction of energy that coupler 5314A may transmit between points 5313 and 5315 as well as the fraction of energy that coupler 5314 may couple out via a set of terminals, denoted 5317 and 5317A. When an input pulse, such as pulse 5320, is received at input 5309 and transmitted, via coupler 5305, to input 5304 of device 5300, the input pulse may be split by symmetric coupler 5302, e.g., at a splitting ratio of 1:1, into ports 5308 and 5310, respectively. A split pulse 5330 transmitted by port 5310 may propagate counterclockwise (i.e., in the direction of arrow 5324) and its phase may be shifted, by coupler 5302, π/2 radians (i.e., crossbar transmission or crossover transmission). The split pulse 5328 transmitted by port 5308 may propagate clockwise (i.e., in the direction of arrow 5326) and its phase may be not be shifted by coupler 5302 (i.e., bar transmission).

It should be noted that if loop 5312 does not include a NLE component, such as amplifier 5316, the pulses 5330 and 5328 that propagate counterclockwise and clockwise, respectively, complete their travel around loop 5312 and return to ports 5308 and 5310, respectively, with equal amplitudes and the same relative phases. The relative phase is maintained because both pulses 5328 and 5330, which propagate in mutually opposite directions, travel exactly the same distance, i.e., the length of loop 5312. The amplitudes of pulses 5328 and 5330 returning to ports 5310 and 5308, respectively, are equal to each other because they travel through the exact same medium, which is symmetric and linear for both propagation directions. This means that pulse 5330 that returns to port 5308 is π/2 radian ahead with respect to pulse 5328 that returns to port 5310. On their return paths, each of pulses 5328 and 5330, upon arrival at ports 5310 and 5308, respectively, may be re-split into ports 5306 and 5304, e.g., at a 1:1 ratio for each split, wherein the crossover split produces a phase shift of π/2 radians and the bar split does not produce any phase shift. Accordingly, the crossbar split of pulse 5330 from port 5308 may destructively interfere with the bar split of pulse 5328 from port 5310, thereby to produce substantially zero output at output port 5306. At the same time, the crossbar split of pulse 5328 from port 5310 may constructively interfere with the bar split of pulse 5330 from port 5308, thereby to produce a reflected signal that carries substantially the entire energy of pulse 5320 reflected back to input port 5304. Part of the signal reflected back into port 5304 may be coupled, by coupler 5305, into terminal 5307 to form there a reflected output signal. Normalizing the input energy of pulse 5320 to a value of 1, the energy at output port 5306, when loop 5312 does not includes NLE 5316, may be given by:

$$I_{5306} = A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \quad (6)$$

Where j indicates a phase shift of π/2 radians, and A is the intensity attenuation factor of attenuator 5314. The energy reflected back to input port 5304 may be given by:

$$I_{5304} = A \cdot \left[ \frac{1}{\sqrt{2}} \cdot \frac{j}{\sqrt{2}} + \frac{j}{\sqrt{2}} \cdot \frac{1}{\sqrt{2}} \right]^2 = A \quad (7)$$

Part of energy $I_{5304}$ reflected back into port 5304 may be coupled, by coupler 5305, into terminal 5307 to form there a reflected output signal.

FIG. 4c schematically illustrates circulator 5305A having three terminals connected to connecting points 5305B, 5305C, and 5305D. Connecting points 5305B, 5305C, and 5305D of FIG. 4c are the same points 5305B, 5305C, and 5305D of FIG. 4a and thus circulator 5305A may replace coupler 5305 in FIG. 4a. Replacing coupler 5305 by circulator 5305A has the advantage of reducing signal intensity loss by transmitting most of the energy from point 5305C to point 5305B and from point 5305B to point 5305D. A circulator such as circulator 5305A may be used to replace any coupler in the designs of the embodiments according to the present invention. For example, a circulator such as circulator 5305A may replace coupler 5305 of FIG. 6, coupler 5305 of FIG. 7, coupler 5568 of FIG. 8b, couplers 5652 and 5656 of FIG. 9b, coupler 5305 of FIG. 10a, and couplers 5305, 5718, 5740 and 5736 of FIG. 10b.

FIG. 5 schematically illustrates a graph showing the relative phase shift and intensity of the output signals of a NLE, for example, amplifier 5316 of FIG. 4a, versus the input signals for two different amplitudes of pulses that propagate in opposite directions. FIG. 5 is useful in analyzing the operation of device 5300 in FIG. 4a where loop 5312 includes amplifier 5316. In analogy to the graph in FIG. 1a, the graph of FIG. 5 shows the transmission function of the output intensity Io and the output phase shift $\Delta \phi$ of NLE amplifier 5316 versus the input intensity Ii. When lower level input pulse 5320 having a normalized field amplitude value of 1 is received, from input 5309 via coupler 5305, by input 5304 of device 5300 in FIG. 4a, the field amplitude of split pulse 5330, denoted 5400 in FIG. 5, propagating in the counterclockwise direction indicated by arrow 5324 in FIG. 4a, is $1/\sqrt{2}$ at the entrance of amplifier 5316. Further, in this scenario, the field amplitude of split pulse 5328, denoted 5402 in FIG. 5, propagating in the clockwise direction indicated by arrow 5326 in FIG. 4a, is $\sqrt{A}/\sqrt{2}$ at the entrance to amplifier 5316. Factor A represents the level of power intensity attenuation resulting from attenuator 5314. Since both pulses, i.e., pulses 5400 and 5402, may be within the linear range of amplifier 5316, the two pulses may be amplified by amplifier 5316 by the same intensity gain factor $G_{liner}$. The two pulses are also attenuated by the same factor A at attenuator 5314. Accordingly, both pulses return to ports 5308 and 5310 after undergoing substantially the same attenuation, A, and the same amplification, $G_{linear}$. Thus, the amplitudes of the two pulses, after amplification and attenuation, may be substantially equal to each other.

As described above, pulses 5400 and 5402 enter amplifier 5316 of FIG. 4a with different field amplitudes, e.g., $1/\sqrt{2}$ and $\sqrt{A}/\sqrt{2}$, respectively. Accordingly, amplifier 5316 may shift the phases of pulses 5400 and 5402 by different amounts. However, since pulses 5400 and 5402 are low amplitude pulses, their phases may be shifted only by small shifts, $\Delta\phi_2$ and $\Delta\phi_2$; respectively, yielding an even smaller additional relative phase shift, $d(\Delta\phi_2)=\Delta\phi_2-\Delta\phi_2$; between the pulses. The influence of such additional relative phase shift is generally insignificant for the purposes of the invention. Accordingly, the additional relative phase shift produced by amplifier 5316 between pulses 5400 and 5402 is negligible and pulses 5400 and 5402 may return to ports 5308 and 5310 with amplitudes that are substantially equal to each other and with a relative phase shift substantially equal to their original relative phase shift, i.e., similar to the relative phase shift originally produced by coupler 5302, e.g., a phase shift of about $\pi/2$ radians.

Because the amplitudes of the pulses returning to ports 5308 and 5310 are substantially equal to each other, and due to the small influence of amplifier 5316 on the relative phases of pulses 5400 and 5402 for low level input signals, the behavior of device 5300 in this case may be generally similar to that of an analogous device (not shown) without amplifier 5316 in loop 5312. Accordingly, in the case of low level input signals, substantially all the energy of pulse 5320, after amplification by gain $G_{linear}$ and attenuation A, may be reflected back to input 5304. Based on the above, the intensity $I_{5306}$ at output port 5306 and the intensity $I_{5304}$ reflected back to port 5304 may be given by the following equations:

$$I_{5306} = G_{linear} \cdot A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \qquad (8)$$

$$I_{5304} = G_{linear} \cdot A \cdot \left[ \frac{1}{\sqrt{2}} \cdot \frac{j}{\sqrt{2}} + \frac{j}{\sqrt{2}} \cdot \frac{1}{\sqrt{2}} \right]^2 = G_{linear} \cdot A$$

Part of energy $I_{5304}$ reflected back into port 5304 may be coupled, by coupler 5305, into terminal 5307 to form there a reflected output signal, wherein $G_{linear}$ represents the intensity amplification gain within the linear range.

For higher-level input pulses, for example, pulse 5322 in FIG. 4a, having field amplitude H, the counterclockwise split pulse 5404 may enter amplifier 5316 with a field amplitude $H/\sqrt{2}$, which falls within the saturation range of amplifier 5316. The clockwise split pulse 5406 may enter amplifier 5316 with a field amplitude $\sqrt{A}\cdot H/\sqrt{2}$, which falls within the linear range of amplifier 5316. Counterclockwise split pulse 5404 is amplified by amplifier 5316 by intensity gain factor $G_{sat}$, which is smaller than $G_{linear}$ due to the reduced gain in the saturation region, and the phase of pulse 5404 is shifted by the same amplifier 5316 by $\Delta\phi_1=\Delta\phi_{sat}$. Clockwise split pulse 5406 is amplified by amplifier 5316 by gain factor $G_{linear}$, in the linear region, and the phase of pulse 5406 is shifted by the same amplifier 5316 by $\Delta\phi_{1'}$. Although the ratio between low amplitude pulses 5400 and 5402 may be similar to the ratio between higher amplitude pulses 5404 and 5406, namely, a ratio equal to one divided by the field amplitude attenuation factor $\sqrt{A}$, the difference between the amplitudes of pulses 5404 and 5406 may be much larger than the difference between the amplitudes of pulses 5400 and 5402. Accordingly, the relative phase shift between high level pulses 5404 and 5406, denoted $d(\Delta\phi_1)=(\Delta\phi_{sat}-\Delta\phi_{1'})$, may be much larger than the relative phase shift between low level pulses 5400 and 5402, denoted $d(\Delta\phi_2)$. This means that pulses 5404 and 5406 return to ports 5308 and 5310 with different field amplitudes $\sqrt{G_{sat}}\cdot\sqrt{A}\cdot H/\sqrt{2}$, $\sqrt{G_{linear}}\cdot\sqrt{A}\cdot H/\sqrt{2}$, respectively, and significant different phase shifts, $\Delta\phi_{sat}$ and $\Delta\phi_1$, respectively.

Thus, for such high level inputs, when choosing the proper length of amplifier 5316, $d(\Delta\phi_1)$ may be adjusted to be equal to $\pi$ radians while still maintaining a negligible value, $d(\Delta\phi_2)$, of the relative phase shift for low-level input amplitudes. When $d(\Delta\phi_1)$ is equal to $\pi$ radians, a relatively large fraction of the energy of the higher-level input pulse 5322 may be emitted out by device 5300 through its output 5306 and only a small fraction may be reflected back through input 5304. In this case, the output intensity $I_{5306}$ and the intensity $I_{5304}$ reflected back into input 5304 may be given by:

$$I_{5306} = H^2 \cdot A \cdot \left[ \frac{\sqrt{G_{linear}}}{\sqrt{2}} \cdot \frac{1}{\sqrt{2}} + \frac{\sqrt{G_{sat}}}{\sqrt{2}} \cdot \frac{1}{\sqrt{2}} \right]^2 \neq 0 \qquad (9)$$

$$I_{5304} = H^2 \cdot A \cdot \left[ \frac{\sqrt{G_{linear}}}{\sqrt{2}} \cdot \frac{j}{\sqrt{2}} - \frac{j}{\sqrt{2}} \cdot \frac{\sqrt{G_{sat}}}{\sqrt{2}} \right]^2$$

Part of energy $I_{5304}$ reflected back into port 5304 may be coupled, by coupler 5305, into terminal 5307 to form there a reflected output signal.

In the above discussion, device 5300 is analyzed for the case where the reduced amplitude pulse 5406 is in the linear region of amplifier 5316 and the unreduced amplitude pulse 5404 is in the saturated region of that amplifier. It should be noted that there are at least two additional settings relevant to describing effective operation of device 5300. In a first additional setting, pulses 5406 and 5404 have the same gain $G_{linear}$; however, the phase sifts produced for the two pulses by amplifier 5316 are different. In a second additional setting, amplifier 5316 shifts the phases of pulses 5406 and 5404 by the same amount $\Delta\phi_1 = \Delta\phi_{sat}$; however, the gains produced for the two pulses by amplifier 5316 are different.

It should be appreciated that the analysis of device 5300 for the two additional settings of device 5300, in the case of low level input signals, may be generally the same as discussed above with reference to the case where no output signal is produced. Therefore, the two additional settings of device 5300 are not further analyzed herein in the context of low-level input signals.

Analyzing device 5300 in the range of high input signals, according to the first additional setting, it is noted that pulses 5406 and 5404 are both in the linear region of amplifier 5316. In this case, when amplifier 5316 is sufficiently long, when the length of the amplifier is appropriately adjusted and when attenuation factor A is adjusted to produce the proper ratio between pulses 5404 and 5406, the relative phase shift $d(\Delta\phi_1)$ may be adjusted to be equal to $\pi$ radians even when the amplitude of pulse 5404 is still in the linear range. Accordingly, pulses 5404 and 5406 are amplified by the same factor $G_{linear}$. Therefore, $G_{sat}$ may be replaced by $G_{linear}$ in the above equations 9, taking into account phase inversion. In this first additional setting, for high-level input signals, the entire energy may be emitted from output port 5306 and substantially no energy may be reflected back through input 5304. In such a case, coupler 5305 does not transmit any signal from terminal 5304 to terminal 5307 and thus no reflected output signal is produced at port 5307.

According to the second additional setting, analyzed for the case of high level input signals, the amplitude of pulse 5406 may be sufficiently high to be included in the saturated range of amplifier 5316 and, thus, amplifier 5316 may not produce any relative phase shift $d(\Delta\phi_1)$ between pulse 5406 and pulse 5404, because both pulses are in the saturated region of amplifier 5316. However, since pulse 5404 may be at a much deeper saturation level than pulse 5406, pulse 5404 may have a gain, $G_{sat1}$, that is much lower than the gain, $G_{sat2}$, of pulse 5406. In this case, the transmitted intensity $I_{5306}$ and the reflected intensity $I_{5304}$ may be given by:

$$I_{5306} = H^2 \cdot A \cdot \left[ \frac{\sqrt{G_{lsat2}}}{\sqrt{2}} \cdot \frac{1}{\sqrt{2}} - \frac{\sqrt{G_{sat1}}}{\sqrt{2}} \cdot \frac{1}{\sqrt{2}} \right]^2 \neq 0 \qquad (10)$$

$$I_{5304} = H^2 \cdot A \cdot \left[ \frac{\sqrt{G_{lisat2}}}{\sqrt{2}} \cdot \frac{j}{\sqrt{2}} + \frac{j}{\sqrt{2}} \cdot \frac{\sqrt{G_{sat1}}}{\sqrt{2}} \right]^2$$

Accordingly, device 5300 may operate as a threshold device that produces substantially no output signal for lower level input signals, while emitting a large fraction of the energy of higher level input signals through its output 5306. It is clear that, for all the versions of device 5300 described above, the larger the ratio between pulses 5404 and 5406, the larger the relative phase shift $d(\Delta\phi_1)$ between the pulses and the larger the different between $G_{linear}$ and $G_{sat}$, resulting in improved operation of device 5306 for the higher level input signals. It should be appreciated that, in device 5300 according to exemplary embodiments of the present invention, there may be virtually no limitation on the ratio between pulses 5404 and 5406, and the ratio may be as desired, for example, equal to one over the attenuation factor of attenuator 5314. Further, in view of the above analysis, it should be appreciated that although the use of a large attenuation factor, i.e., a small value for A, may improve the performance of device 5300 in the range of higher level input signals, such large attenuation does not degrade the performance of device 5300 in the range of lower level input signals.

Referring again to FIG. 4a, a virtual mid point 5318 divides loop 5312 into two halves, wherein each half has an equal length, S, representing the distance from port 5310 to mid point 5318 or from port 5308 to mid point 5318. We may also refer to mid point 5318 of loop 5312 as center 5318 of loop 5312. It should be clear that in the descriptions of the embodiments according to the present invention the terms mid point of the loop and center of the loop are the same geometrical point and the use of those terms is done alternatively. It is noted that the counterclockwise pulse 5330 and the clockwise pulse 5328 inherently meet and overlap each other at mid point 5318. When streams of pulses that are separated from each other by time periods, T, enter loop 5312 of device 5300, and split into clockwise and counter-clockwise streams, a pulse in the counterclockwise stream, such as pulse 5330, meets a pulse in the clockwise stream, such as pulse 5328, every half time period, T/2. This means that after every distance X=T/2·C/n, wherein C is the speed of light in vacuum and n is the refractive index of the optical guides, there is a meeting ("collision") point between pulses that propagate in loop 5312 in opposite directions. To avoid such collisions from occurring at the NLE, e.g., at amplifier 5316, the location of the NLE should be off center by a distance $\delta S$ that may be given by:

$$l \cdot X < \delta S < m \cdot X \qquad (11)$$

where X is the above given distance between two adjacent meeting (collision) points and l and m are consecutive integers. For the specific example of l=0 and m=1, Equation 11 may be reduced to: $\delta S < X$.

When a low amplitude pulse, such as pulse 5406, enters amplifier 5316 first, the pulse does not deplete an inverse population of the amplifier and, thus, a higher amplitude pulse 5404 may enter the NLE immediately following the exit of pulse 5406. In a situation when the order of the locations of amplifier 5316 and attenuator 5314 is reversed, the higher amplitude pulse may enter NLE 5316 first. In this reverse order case, the higher amplitude pulse may deplete the inverse population of amplifier 5316 and, thus, a recovery time A may be needed for amplifier 5316 to build an inverse population before entry of a lower amplitude pulse. Therefore, in the latter case, or in a situation where the stream of input pulses includes only high amplitude pulses, T/2 may be longer than $\Delta\tau$.

As discussed above, the efficiency of device 5300 may be improved by increasing the ratio between the higher and the lower levels included in the input signal. Further, the output signals produced by device 5300 that correspond to different levels of input pulses have a more distinctive amplitude ratio than the ratio between their respective input pulses. Accordingly, an improved threshold system in accordance with exemplary embodiments of the present invention may include a configuration of a more than one device 5300, for example, at least two devices 5300 connected in series, wherein the output signals from one device 5300 may be fed directly into the input of a subsequent device 5300. Such a configuration may be used to improve threshold capability by further accentuating the distinction between lower and higher amplitude pulses.

Figure 6:
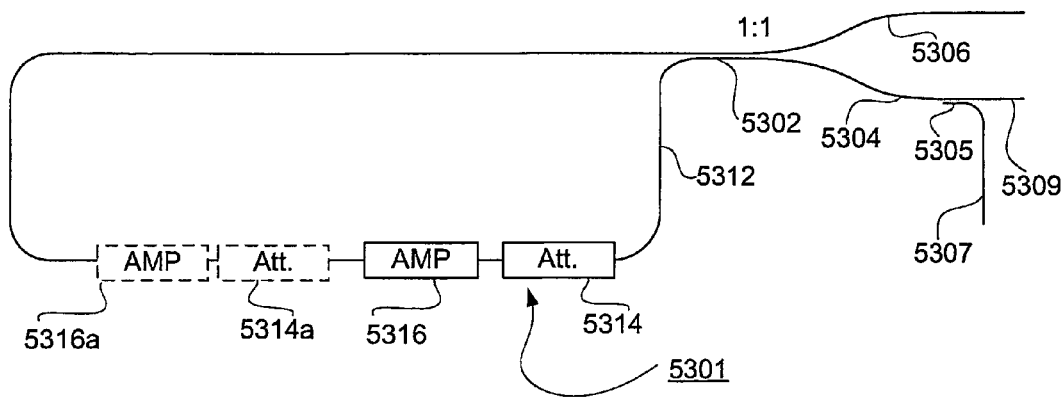
FIG. 6 is a schematic illustration of an alternative design for a threshold device including a non-linear optical loop according to exemplary embodiments of the present invention.

Referring to FIG. 6, a threshold device 5301 in accordance with further exemplary embodiments of the invention is shown. The design of device 5301 is a modified version of the design of device 5300. In addition to the NLE-attenuator functionality, which may be performed by amplifier 5316 and attenuator 5314, as described above with reference to device 5300, device 5301 includes additional NLE-attenuator functionality, which may be embodied in the form of an amplifier 5316a and an attenuator 5314a. As discussed above with reference to optimizing the operation of device 5300, the length of amplifier 5316 may be adjusted to produce a relative phase shift $d(\Delta\phi_1)$ equal to $\pi$ radians. However, since the required adjusted length for amplifier 5316 in device 5300 may not be commercially available and may be difficult to produce, the additional set of amplifier 5316a and attenuator 5314a may be added to enable such adjustment. In this case the required length of each amplifier (5316 or 5316a) of device 5301 may be about half of the required length required for the single amplifier 5316 in device 5300. In some alternative embodiments, similar relative phase shifting may be achieved by adding only amplifier 5316a, i.e., without using attenuator 5314a; however, the addition of attenuator 5314a may useful to enable a further increase of the amplitude ratio between the counterclockwise and the clockwise signals propagating in loop 5312.

Figure 7:
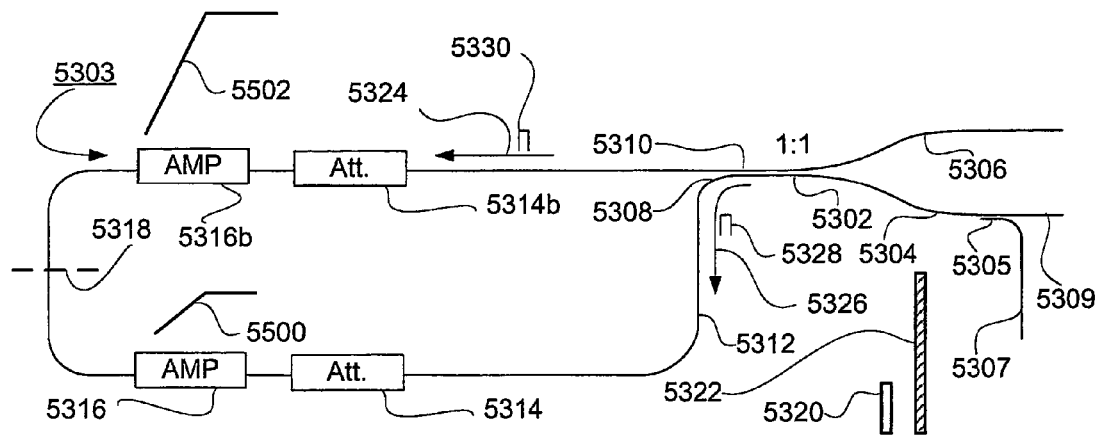
FIG. 7 is a schematic illustration of another alternative design for a threshold device including a non-linear loop structure according to exemplary embodiments of the present invention.

FIG. 7 schematically illustrates a device 5303, which is a variation of the design of device 5300 of FIG. 4a. Device 5303 may enable expansion of the range of lower level input signal for which the very high performance and output signals very close to zero may be obtained. As shown in FIG. 7, device 5303 has generally the same structure as device 5300, with the addition of an amplifier 5316b and an attenuator 5314b. Except for amplifier 5316b and attenuator 5314b, identical reference numerals are used in FIGS. 4a and 7 to indicate components with identical or similar structure and functionality. The parameters of attenuator 5314b and amplifier 5316b may be generally identical to those of attenuator 5314 and amplifier 5316, respectively; however, amplifier 5316b may be excited to a higher excitation level than amplifier 5316. Transmission functions of amplifiers 5316b and 5316 are roughly illustrated by symbols 5502 and 5500, respectively, in FIG. 7.

For lower level input signals, such as pulse 5320, amplifiers 5316b and 5316 both operate at their linear region in a similar way and, thus, loop 5312 may be quasi-symmetric and the entire energy of the input signal may be reflected back into input 5304. Coupler 5305 may transmit part of the signal reflected back into terminal 5304 to terminal 5307 to produce there a reflected output signal. However, the range of the low level input signals for which the output signals are very close to zero is expanded in device 5303 relative to device 5300. This range expansion is possible because the quasi-symmetric configuration of loop 5312 is maintained in device 5303 for a wider range of input amplitudes due to a phase shift compensation produced by amplifier 5316b to compensate for the small phase shift that amplifier 5316 may produce, as described in detail above. Since amplifiers 5316 and 5316b are excited to different levels of excitations, their gain and phase shifts may not be identical and, therefore, it is appreciated that the phase shift compensation of amplifier 5316b applied to the phase shift of amplifier 5316 may not be perfect. However, since the phase shifts produced by amplifiers 5316 and 5316b in the range of low level input signals is generally small, the difference between these phase shifts (after the compensation) is smaller yet and has no significant influence on the operation of device 5303 over a wider range of lower level input signals.

For higher-level input signals, such as pulse 5322, the additional amplifier 5316b is still within the range of small phase shifts in the linear region and may operate quasi-symmetrically for both counterclockwise and clockwise pulses, such as pulses 5330 and 5328. Thus the set of amplifier 5316b and attenuator 5314b maintains their quasi-symmetry even for the higher-level input signals. However, amplifier 5316 having a saturation level that is lower than the saturation level of amplifier 5316b is driven into a saturation state by the counterclockwise pulses 5330 it receives, yet the amplifier is not driven into saturation by the clockwise pulses 5328 it receives. Accordingly, in this situation, the set of amplifier 5316 and attenuator 5314 "breaks" the symmetry of loop 5312 in a way similar to that explained above with reference to device 5300 of FIG. 4a. At the same time, the set of amplifier 5316b and attenuator 5314b has little influence on the symmetry of loop 5312. Accordingly, in this situation, for higher-level input signal, only amplifier 5316 and attenuator 5314 have a significant role in the production of output signals, whereby device 5303 operates in this range in a manner similar to the operation of device 5300 as discussed above with reference to FIG. 4a.

In accordance with embodiments of the invention, each of devices 5301 and 5303 may have a "turn on" point, which may function as a threshold level. For low-level input signals in the range, e.g., below the "turn on" threshold level, output signals are strongly attenuated by destructive interference at the output port of the devices and the transmission function between the input and the output of these devices includes a monotonic range with a shallow slope. For high-level input signals, e.g., in a range above the "turn on" threshold level, the output signal at the output port of the devices increases sharply and the transmission function between the input and the output of these devices may include a range having a steep monotonic slope.

Adjustable parameters that may be used to adjust the "turn on" threshold may include but are not limited to the gain G and the length L of amplifiers 5316, 5316a and 5316b, and the attenuations of attenuators 5314, 5314a and 5314b. The excitation levels, the gains, and the attenuations of the different amplifiers and attenuators may be different for each amplifier and/or attenuator.

III. All Optical gates and Switches Using Threshold Devices

Referring to FIGS. 2b, 2c, 2d, 4a, 6 and 7, illustrating devices 5040, 5041, 5043, 5300, 5301 and 5303, respectively. Devices 5040, 5041, and 5043 of FIGS. 2b, 2c, and 2d, respectively, have two output ports 5061 and 5062. When respective input signals 5029, 5028, and 5027 are above and below the threshold levels of devices 5040, 5041, and 5043 of FIGS. 2b, 2c, and 2d, these input signals are respectively transmitted or blocked, by devices, 5040, 5041, and 5043 on their way out to be emitted by port 5062 as output signals 5082, 5083, and 5087. When devices 5040, 5041 and 5043 are used as threshold devices in the way described above, only output port 5062 is used to transmit and block output signals 5082, 5083, and 5087 of FIGS. 2b, 2c, and 2d, respectively.

However, output port 5061 may be used as well. Ports 5061 and 5062 are the output terminals of same combiner (coupler) 5060 and thus are complimentary ports. This means that in a situation in which at one of the ports, 5061 or 5062, a constructive interference is produced, then a destructive interference is produced at the other port. Accordingly, when respective input signals 5029, 5028, and 5027 are above or below the threshold levels of devices 5040, 5041, and 5043 of FIGS. 2b, 2c, and 2d, these input signals are respectively blocked or transmitted, by devices, 5040, 5041, and 5043 on their way out to be emitted by port 5061.

It can be seen that outputs 5061 and 5062 operate as alternating ports. For input signals above the threshold level, port 5061 is a blocking port and port 5062 is a transmitting port. Similarly, for input signals below the threshold level, port 5061 is a transmitting port and port 5062 is a blocking port.

Similarly, while threshold devices 5300, 5301, and 5303 of FIGS. 4a, 6, and 7, respectively, are described above with respect to only one output 5306, they may operate in a way similar to devices 5040, 5041, and 5043 of FIGS. 2b, 2c, and 2d, respectively, with two output ports operating alternatively. When input signal, such as, signal 5322 of FIGS. 4a, 6 (not shown) and 7 is above the threshold level of devices 5300, 5301, and 5303, loop 5312 transmits the input signal to output port 5306 and no signal is emitted by output port 5307. In a situation where the input signal, such as, signal 5320 of FIGS. 4a, 6 (not shown) and 7 is below the threshold level of devices 5300, 5301, and 5303, loop 5312 reflects the input signal back into coupler 5305 that couples part of the reflected input signal into output port 5307 and no signal is emitted by output port 5306.

It can be seen that outputs 5307 and 5306 operate as alternating ports. For input signals above the threshold level, port 5307 is a blocking port and port 5306 is a transmitting port. Similarly, for input signals below the threshold level, port 5307 is a transmitting port and port 5306 is a blocking port.

Accordingly, it can be seen that each threshold device 5040, 5041, 5043, 5300, 5301, and 5303 of FIGS. 2b, 2c, 2d, 4a, 6, and 7, respectively, has two alternating outputs. Only one of these outputs produces an output signal when the input signal is above the threshold level and only the other output produces an output signal when the input signal is below the threshold level.

III. I. Electronically Activated All-Optical Gates and Switches

Figure 8A:
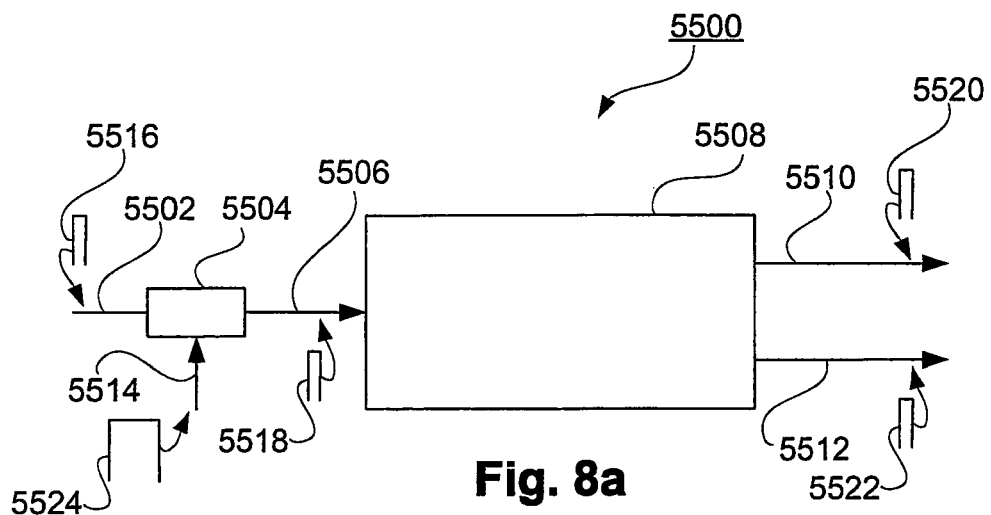
FIGS. 8a and 8b are schematic illustrations of all-optical switches or gates designed according to the present invention activated electronically and optically, respectively.

Referring to FIG. 8a, illustrating switch 5500 that may be used as a gate as well. Switch 5500 includes input 5502 connected to NLE 5504 that is connected to input 5506 of threshold device 5508 having output terminals 5510 and 5512. NLE 5504 may be an optical amplifier, such as, SOA, LOA, or EDFA. NLE 5504 has an electronic terminal 5514 through which electrical current 5524 is injected into NLE 5504. Threshold device 5508 is a block diagram presentation that may represent any optical threshold device and in particular the threshold devices according to the present invention. Input terminal 5506 and output terminals 5510 and 5512 of threshold device 5508 may represent input terminal 5044 and output terminals 5062 and 5061 of threshold devices 5040, 5041, and 5043 of FIGS. 2b, 2c, and 2d, respectively. Similarly, Input terminal 5506 and output terminals 5510 and 5512 of threshold device 5508 may represent input terminal 5309 and output terminals 5306 and 5307 of threshold devices 5300, 5301, and 5303 of FIGS. 4a, 6, and 7, respectively.

Input signal 5516 is received at input 5502 and passes through NLE 5504 to appear, as signal 5518, at input 5506 of threshold device 5508. When NLE 5504 is, for example a SOA, injection current 5524 at port 5514 of NLE 5504 may be adjusted to have current level $C_1$; a current that produces an optical amplification, at NLE 5504, which causes signal 5518 at input 5506 of device 5508 to be above the optical threshold level of device 5508. In such a case signal 5518 appears, at output port 5510 of device 5508, as signal 5520 and no output signal is produced at port 5512. In another situation where injection current 5524 at port 5514 of NLE 5504 is adjusted to have a current level $C_2$; a current that produces a different optical amplification (or even optical loss), at NLE 5504, which causes signal 5518 at input 5506 of device 5508 to be below the optical threshold level of device 5508, signal 5518 appears, at output port 5512 of device 5508, as signal 5522 and no output signal is produced at port 5510.

Accordingly, device 5500 operates as a "1 by 2" (1×2) all optical switch that may route the signal from input 5502 either to output 5510 or to output 5512, depends on the electrical current 5524 injected via terminal 5514 of NLE 5504. For electrical injection current 5524 with current level $C_1$ at terminal 5514, the output signal appears, as signal 5520, at port 5510 and no output signal is produced at port 5512. For injection current 5524 with current level $C_2$ at terminal 5514, the output signal appears, as signal 5522, at port 5512 and no output signal is produced at port 5510. Thus, optical switching between input 5502 and outputs 5510 and 5512 is produced by changing electrical current 5524, at terminal 5514, between the values $C_1$ and $C_2$.

When only one output terminal 5510 or 5512 is of interest for monitoring either output signal 5520 or 5522, respectively, device 5500 operates as a gate that may transmit or block the signal, at the only used output port, according to electrical current 5524 injected at terminal 5514 of NLE 5504.

The total activation time of a switch electronically activated is the sum of: (a) The time needed for the controller to change the level of the current activating the switch. (b) The time needed for the optical switch to change its state. The discussion below relates only to the switching time of the switch itself (clause (b)) without taking into account the time needed to change the state of the controller (clause (a)). The activation time of switch (or gate) 5500 depends on the time needed to change injected current 5524 from $C_1$ to $C_2$ and vice versa. The time needed to change injection current 5524 from $C_1$ to $C_2$ depends of the lifetime of the injected electrons and is in the range of 200 ps. The time needed to change injection current 5524 from $C_2$ to $C_1$ is very short and depends of the time that takes to the stimulated emission in NLE 5504 to deplete the inverse population of the charge carriers in NLE 5504.

Though the activation time of 200 ps for switch 5500 is fast, it limits the switching rate to be 5 Gbps=1/200 ps at the most. The activation time can be even shorter when using optical activation, as used in device 5550 of FIG. 8b, instead of the electronic activation of device 5500 of FIG. 8a.

III. II. Optically Activated All-Optical Gates and Switches

Figure 8B:
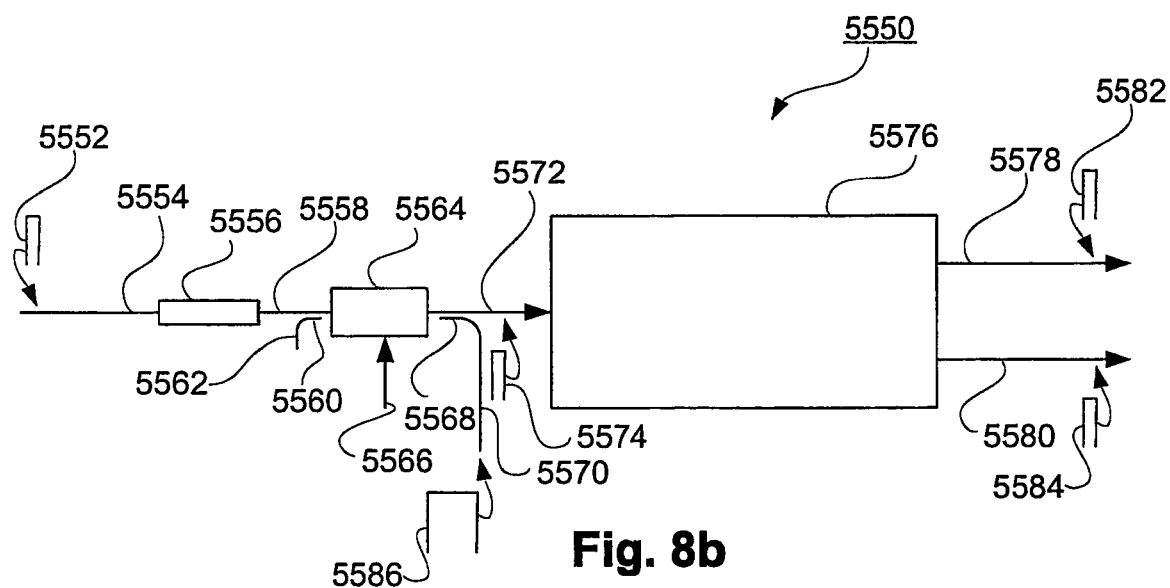

FIG. 8b illustrate a switch (or gate) 5550 that is activated optically. Switch 5550 receives signal 5552 at input 5554 that may includes optical isolator 5556. Signal 5552 propagates from input 5554 via isolator 5556, guide 5558, and coupler 5560 into NLE 5564. From NLE 5564 signal 5552 propagates via coupler 5568 to appear as signal 5574 at input 5572 of threshold device 5576 having outputs 5578 and

5580. Threshold device 5576 is a block diagram illustration that represents threshold devices similar to the threshold devices that block 5508 of FIG. 8*a* represents. Isolator 5556 may be used to block back reflection of radiation reflected from device 5576 toward input 5554. NLE 5564 may be an optical amplifier, such as, SOA, LOA, and EDFA.

Electrical terminal 5566 is used to inject current into NLE 5564. When NLE 5564 is, for example a SOA, the injected current from terminal 5566 is adjusted to produce amplification, at NLE 5564, that produces signal 5574 at input 5572 that is above the threshold level of device 5576. In such a case, signal 5574 from input 5572 appears, as signal 5582, at output port 5578 and no signal is produced at output port 5580.

To switch the output that emits the signal from output port 5578 to output port 5580, optical signal 5586 having intensity P is coupled into optical guide 5570. Optical signal 5586 propagates from guide 5570 to coupler 5568 that couples signal 5586 into guide 5572 and from there into NLE 5564. Signal 5586 may have a wavelength that is different from the wavelength of input signal 5552. Accordingly, when using wavelength sensitive couplers, signal 5586 may be coupled completely, by coupler 5568, from guide 5570 into guide 5572 prior to the entrance of signal 5586 into NLE and may be coupled out completely, by coupler 5560, from guide 5558 to guide 5562. At the same time, signal 5552 may pass from guide 5558 to guide 5572, through couplers 5560 and 5568, without loosing any energy due to wavelength sensitive coupling process in couplers 5560 and 5568.

When signal 5586 having intensity P is coupled, by coupler 5568 from guide 5570 into guide 5572 and from there into NLE 5564, it depletes the excitation level of NLE 5564 and may drive NLE 5564 into a saturation state. When the intensity P of signal 5586 is high enough to deplete and/or saturate NLE 5564, the amplification of NLE 5564 for input signal 5552 reduces and signal 5552 appears, at input 5572, as signal 5574 having amplitude that is below the threshold level of device 5576. In such a case, signal 5574 appears at output 5580 as signal 5584 and no signal is produced by output port 5578.

Accordingly, device 5550 operates as a "1 by 2" all optical switch that may route the signal from input 5552 either to output 5580 or to output 5578, depends whether optical signal 5586 is or is not coupled into guide 5570, respectively. When optical signal 5586 is coupled into terminal 5570, the output signal appears, as signal 5584, at port 5580 and no output signal is produced at port 5578. In the absence of optical signal 5586 at terminal 5570, the output signal appears, as signal 5582, at port 5578 and no output signal is produced at port 5580. Thus, optical switching between input 5552 and outputs 5578 and 5580 is produced by the presence or absence of optical signal 5586 at terminal 5570.

When only one output terminal 5578 or 5580 is of interest for monitoring either output signal 5582 or 5584, device 5550 operates as a gate that may transmit or block the signal, at the only used output port, according to the presence or absence of signal 5586 at terminal 5570.

The activation time of switch (or gate) 5500 depends on the time needed to change the state of NLE 5564. The time needed to change the state of NLE 5564. into a depleted state (saturated by signal 5586) is the time that takes to the stimulated emission in NLE 5504 to deplete the inverse population of the charge carriers in NLE 5504. This process is very fast and happens almost instantly. The time that takes NLE 5564 to return to its normal state from its depleted state when signal 5586 is removed from port 5570, is the recovery time of NLE 5564, which is in the range of 10 ps. Activation time of 10 ps corresponds to a switching rate of 100 Gbps=1/10 ps.

It can be seen that the longest activation time of device 5550 that is activated optically is 10 ps while the longest activation time of device 5500 that is activated electronically is 200 ps.

Threshold devices 5300, 5301, and 5303 of FIGS. 4*a*, 6, and 7 are phase insensitive. Accordingly, it should be clear that when threshold devices 5508 and 5576 in systems 5500 and 5550 of FIGS. 8*a* and 8*b*, respectively, are of the type of threshold devices 5300, 5301, and 5303 of FIGS. 4*a*, 6, and 7, then switches (or gates) 5500 and 5550 are phase insensitive as well.

Figure 9A:
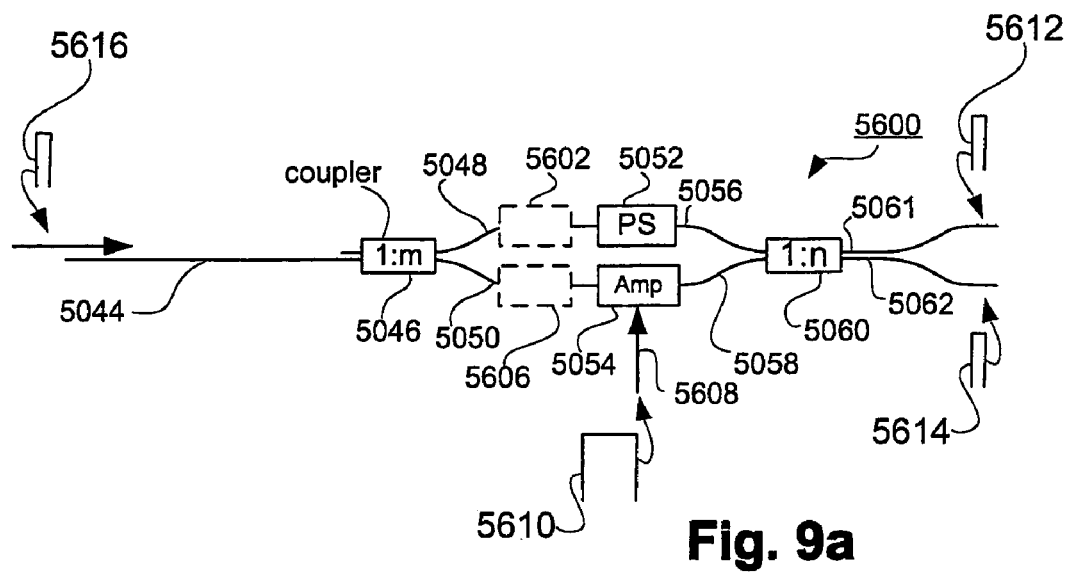
FIGS. 9a and 9b are schematic illustrations of additional all-optical switches or gates according to alternative designs of the present invention activated electronically and optically, respectively.
Figure 9B:
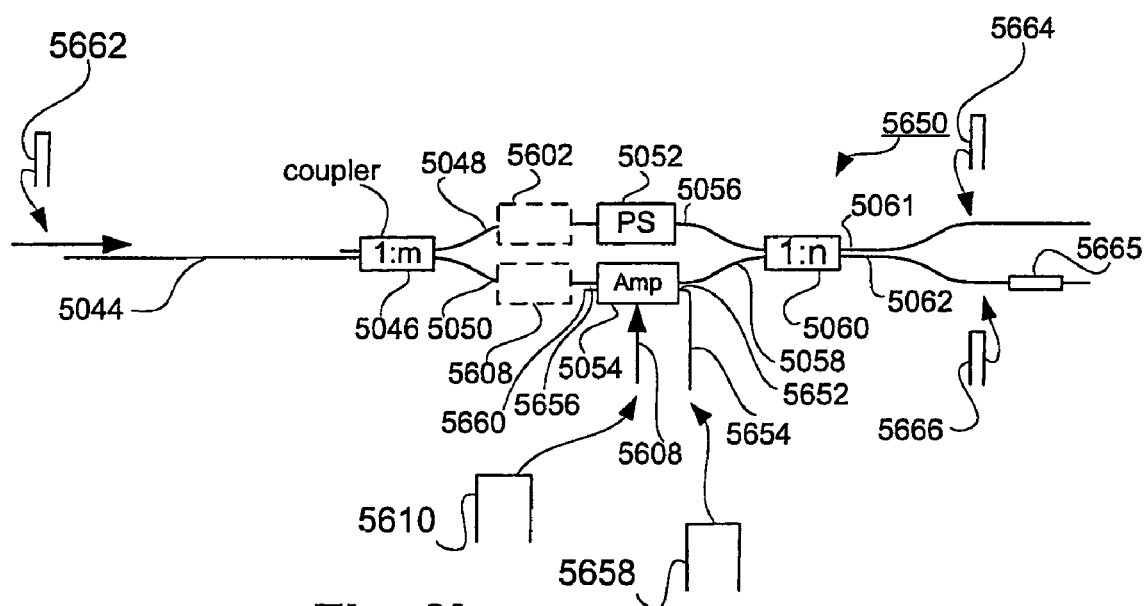

III. III. Additional Electronically and Optically Activated All-Optical Gates and Switches FIGS. 9*a* and 9*b* are schematic illustrations of switches (or gates) in a configuration similar to the configurations of threshold devices 5040, 5401, and 5043 of FIGS. 2*b*, 2*c*, and 2*d*, respectively. Accordingly the same referral numeral are used for the same structures illustrated by FIGS. 2*b*, 2*c*, 2*d*, 9*a*, and 9*b*.

FIG. 9*a* is a general schematic illustration 5600 that may represent all the configurations of devices 5040, 5041, and 5403 of FIGS. 2*b*, 2*c*, and 2*d*, respectively. Components 5602 and 5606 illustrated by broken lines are optional and may or may not be included in device 5600. When components 5602 and 5606 are not included in device 5600, device 5600 represents device 5040 of FIG. 2*b*. When components 5602 and 5060 represent optical attenuators, device 5600 represents device 5041 of FIG. 2*c*. Similarly, when component 5602 represents an optical amplifier and component 5060 is not included, device 5600 represents device 5043 of FIG. 2*d*. For the clarity of the drawings and to avoid crowdedness, closed loop phase control 5070 of FIGS. 2*b*, 2*c*, and 2*d* is not illustrated by FIGS. 9*a* and 9*b* but, loop 5070 may be included in FIGS. 9*a* and 9*b* for dynamically controlling the phase of phase shifter 5052.

In the normal state of switch 5600 input signal 5616 may be adjusted to be either above or below the threshold level of device 5600 to produce output signal 5614 or 5612 only at one output port 5062 or 5061, respectively. NLE 5054 may be an optical amplifier, such as, SOA, LOA, and EDFA. Electronic current signal 5610 may be injected into NLE 5054 via terminal 5608. The current level 5610, the phase shift of shifter 5052, and the intensity of input signal 5616 may be adjusted to cause switch 5600 to emit the output signal either from port 5061 or 5062.

For example and without any limitations, the normal state of switch 5600 may be adjusted to produce an output signal 5614 at port 5062 where electrical current 5610 is injected into NLE 5054 through terminal 5608 is adjusted to have a current level $C_3$. In this case, as explained above for devices 5040, 5041, and 5403 in the descriptions accompanied to FIGS. 2*b*, 2*c*, and 2*d*, respectively, the optical components of input signal 5616 propagating in branches 5048 and 5050 are combined constructively and destructively, by coupler 5060, at ports 5062 and 5061, respectively, to produce signal 5614 at port 5062, and no signal is produced at port 5061.

By changing injection current 5610 to a value $C_4$, the phase shift that NLE 5054 produces may change by $\pi$ radians and causes the optical components of input signal 5616 propagating in branches 5048 and 5050 to be combined constructively and destructively, by coupler 5060, at ports 5061 and 5062, respectively, to produce signal 5612 at port 5061, and no signal is produced at port 5062.

Thus switching the output signal between ports 5062 and 5061 is performed by changing the amount of injected current 5610 from level $C_3$ to $C_4$ and vice versa. For maintaining the situation in which output signal is emitted substantially only from one output port 5061 or 5062 of switch 5600, the following conditions should be fulfilled:

1. Coupler 5060 should be a symmetric coupler (n=1).
2. NLE 5054 should maintain substantially the same gain and π radians phase difference, while injecting alternating currents 5610 of levels $C_3$ to $C_4$, into NLE 5054. For maintaining condition (2) above, the excitation levels of NLE 5054, produced by injection currents with levels $C_3$ and $C_4$, should be high enough to avoid the optical component of input signal 5616, propagating in branch 5050, to drive NLE into a saturation state.

When operating switch 5600 as a gate, only one output 5061 or 5062 is of interest for monitoring output signal 5612 or 5614. To alternatively produce an "on" and "off" state at the selected output of gate 5600, indicated by the presence or absence of signal at this port, injected current 5610 levels should be changed from $C_3$ to $C_4$ and vice versa.

It should be clear that if the "on" and "off" situations should be maintained only at one port 5061 or 5602 when switch 5600 operates as a gate, then coupler 5060 may be a symmetric (n=1) or an asymmetric (n≠1) coupler.

The time response of switch (gate) 5600 equals to the time response of NLE 5054 and may be equal to 200 ps. To increase the speed of switch 5600, the state change of NLE 5054 may be changed optically as illustrated by switch 5650 of FIG. 9b.

FIG. 9b illustrates switch 5650 similar to switch 5600 of FIG. 9a with the exception that the state of NLE 5054 is changed optically by coupling optical signal 5658 into NLE 5054 via input 5654 and coupler 5652, instead of changing injected current 5610 injected to NLE 5054 through terminal 5608 as shown in FIG. 9a. Since device 5650 is similar to device 5600 of FIG. 9a, the explanation provided in the description to FIG. 9a stands also for FIG. 9b and will not be repeated here. FIG. 9b is different from FIG. 9a in the way that NLE 5054 is excited to produce a state change of switch 5650. This process is described below.

In the normal state of device 5650 of FIG. 9b, input signal 5662 appears only at one output 5061 or 5062 as signal 5664 or signal 5666, respectively. For example and without any limitations, the emitting port in the normal state may be port 5062 that emits signal 5666 and no signal is produced at port 5061. In the normal state of device 5650, NLE 5054 is excited, by injection current supplied to NLE 5054 via terminal 5608. The injected current is adjusted to excite NLE 5054 above the excitation level in which the optical component of input signal 5662 propagating in branch 5050 can drive NLE 5054 into a saturation state. To switch between the emitting ports 5061 and 5062 of switch 5650, optical signal 5658 is coupled to port 5654 and from there via coupler 5652 to NLE 5054. Signal 5658 may be coupled out, by coupler 5656, into guide 5660. When couplers 5652 and 5656 are wavelength sensitive, signal 5658 may be completely coupled into NLE 5054 and out from NLE 5054 without affecting the propagation of the optical component of input signal 5662 in branch 5050 having a wavelength that is different from the wavelength of signal 5658. Alternatively, an optical isolator or an optical filter may be included in input terminal 5044 to avoid the propagation of signal 5658 toward the source of input signal 5662. Alternatively, as described above, circulators may replace couplers 5652 and 5656 to avoid the propagation of signal 5658 toward the source of input signal 5662.

Signal 5658 having intensity $P_1$ that may deplete, by stimulated emission, the inverse population of charge carriers produced by the excitation of the current injected to NLE 5054 via terminal 5654. Accordingly, the injection of optical pulse 5658 into NLE 5054 is equivalent to a reduction of the injection level of the electrical current injected into NLE 5054 from terminal 5608. In the presence of optical pulse 5658 at port 5654, the phase shift that NLE 5054 produces may be changed by π radians and cause the optical components of input signal 5662 propagating in branches 5048 and 5050 to be combined constructively and destructively, by coupler 5060, at ports 5061 and 5062, respectively, to produce signal 5664 at port 5061, and no signal is produced at port 5062.

Thus switching the output signal between ports 5062 and 5061 is performed by the presence or absence of optical signal 5658 at port 5654.

While in switch 5600 of FIG. 9a the switching is performed by changing the injected current 5610 at terminal 5608 from level $C_3$ to $C_4$ and vice versa, the normal state of switch 5650 of FIG. 9b may use the same injection current level $C_3$ as a constant operating current, while the switching is performed by injecting optical signal 5658 into NLE 5054 via port 5654 that effectively changes the excitation level of NLE 5054 into a similar level that the injected current with level $C_4$ produces. It should be clear that the current injected via terminal 5610 of switch 5650 is maintained fixed during the switching and the effective excitation is only changed by the injection of optical signal 5658 to NLE 5054 via port 5654.

The effect of the optical injection may be analyzed in an alternative way. When injected signal 5658 is present inside NLE 5054 at the time that the optical component of input signal 5662 is propagating in NLE 5054, the intensities of both optical signals inside NLE 5054 are superimposed and the component of input signal 5662 appears in NLE 5054 as being with higher intensity. The effective higher intensity of the optical component of signal 5662 may experience, in NLE 5054, a phase shift that is greater by π radians than the phase shift that this optical component would experience, in NLE 5054, in the absence of signal 5658.

In the normal state of switch 5650, the excitation level of NLE 5054 is higher than the excitation of NLE 5054 when optical activating (control) signal 5658 (or electronic activating signal 5610) depletes part of the inverse population of NLE 5054. A reduction in the inverse population may reduce the gain of NLE 5054 and my cause to signal 5664 produced at port 5061 in the presence of activating signal 5658 or 5610 to be smaller than signal 5666 produced at port 5062 in the absence of activating signals 5658 and 5610. To maintain equal intensity for signals 5664 and 5666 at ports 5061 and 5062, respectively, intensity equalizer device 5665 may be used at port 5062 to prevent from signal 5666 to be stronger than signal 5664. Equalizing device 5665 may be an attenuator or intensity limiter based on a saturated optical amplifier.

An equalizing device, such as equalizing device 5665 of FIG. 9b, may be used as well in the output terminals of the switches illustrated by FIGS. 8a, 8b, 9a, 10a, and 10b to make sure that the intensities of the output signals of these switches at the normal state would be equal to the intensities of the output signals in the activated state.

As explained above switch 5650 may be operated as a gate when only one output port is used to monitor output signal 5664 or 5666. The response time of switch (or gate) 5650 is equal to the recovery time of NLE 5054 and is in the range of 10 ps.

Figure 10A:
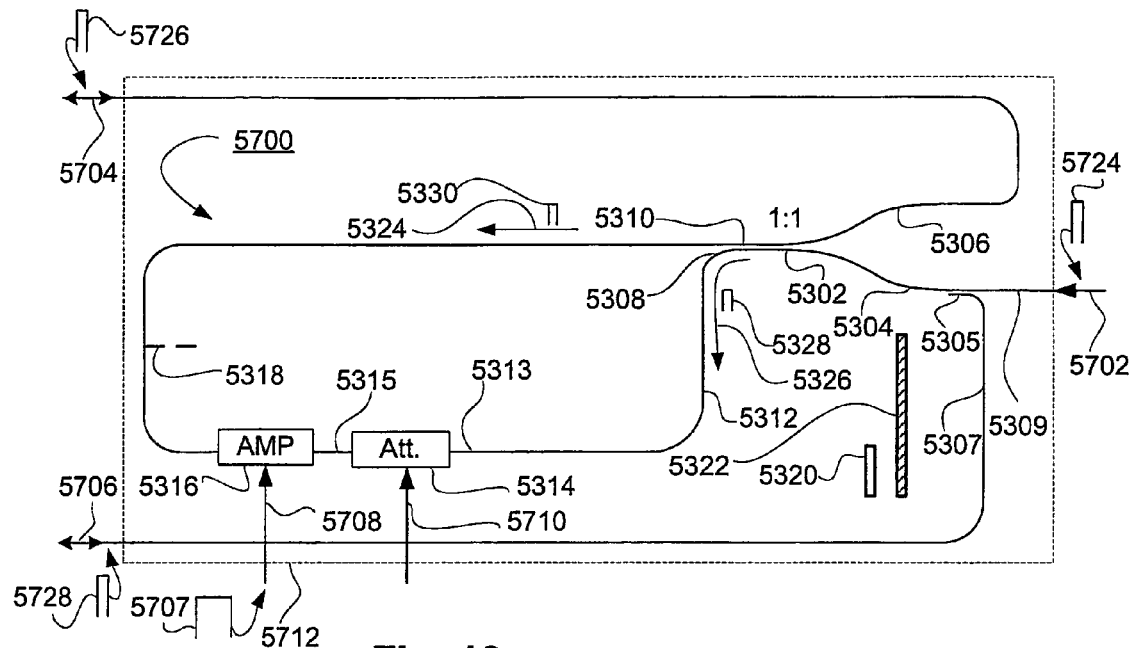
FIGS. 10a and 10b are schematic illustrations of phase insensitive all-optical switches or gates according to the present invention activated electronically and optically, respectively.
Figure 10B:
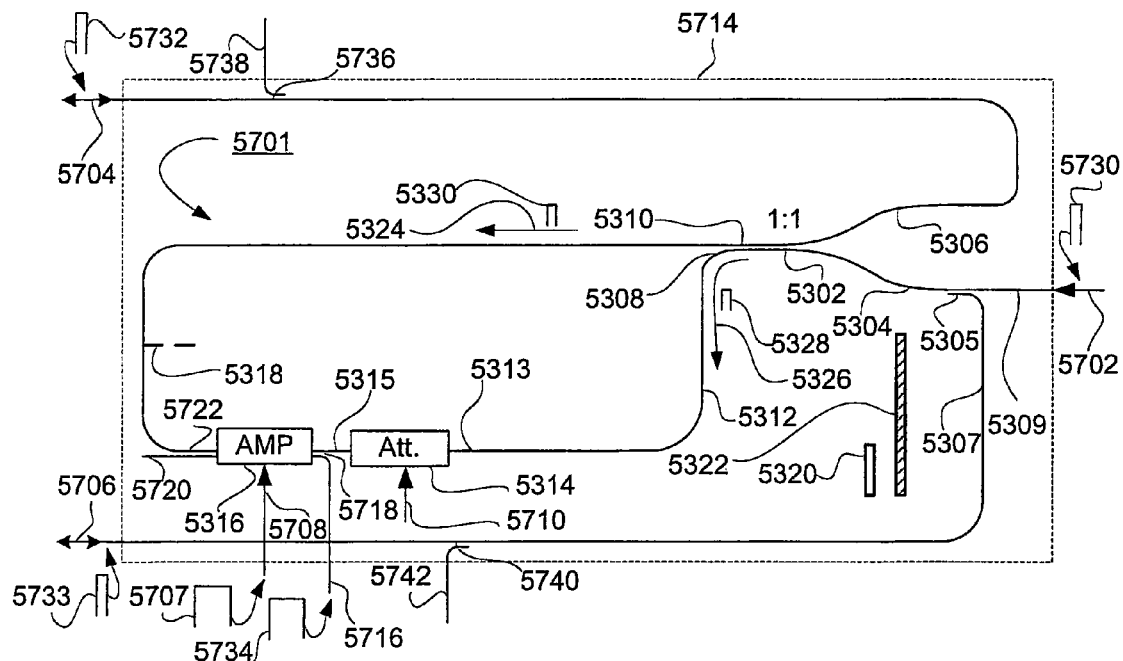

IV. Phase Insensitive, Electronically and Optically Activated All-Optical Gates and Switches FIGS. 10a and 10b illustrate phase insensitive switches (or gates) activated electronically and optically, respectively. Devices 5700 and 5701 of FIG. 10a and 10b, respectively, are similar to device 5300 of FIG. 4a and thus the same referral numeral are used for the same structures and signals illustrated by FIGS. 4a, 10a, and 10b.

Device 5700 of FIG. 10a illustrated in rectangle 5712 that may represent a packaging box having external input terminal 5702 and external terminals 5704 and 5706 that may be external Input/Output (I/O) terminals. External terminals 5702, 5704, and 5706 are connected to input terminal 5309, terminal, 5306, and terminal 5307, respectively. NLE 5316 may be an optical amplifier, such as, SOA, LOA, and EDFA and having electronic terminal 5708 through which excitation current 5707 is injected into NLE 5316. Attenuator 5314 may be of the type illustrated by FIG. 4b, such as, optical amplifier of one of the types of SOA, LOA, and EDFA. Attenuator 5314 may be excited into very low excitation level by an excitation current injected into attenuator 5314 via electronic terminal 5710. The low excitation level by which attenuator 5314 is operated, determines the amount of attenuation that attenuator 5314 produces.

The excitation currents injected into NLE 5316 and attenuator 5314 may be adjusted to be with levels of $C_5$ and $C_6$, respectively, ($C_5 > C_6$), determining the threshold level of device 5700. Input signal 5724 at input port 5702 may be adjusted to have amplitude that is above the threshold level of device 5700, such as, the amplitude of signal 5322 shown in FIG. 4a. In this case, as explained above for device 5300 of FIG. 4a, the optical components of input signal 5724 propagating clockwise and counterclockwise in loop 5312 experience phase shifts that are different by )radians, producing an output signal 5726 received at external I/O port 5704, via port 5306, and no signal is produced at port 5307 or external I/O port 5706. The optical components of input signal 5724, propagating clockwise and counterclockwise in loop 5312, enters NLE 5316 prior and post to their attenuation by attenuator 5314 and thus have different amplitudes similar to amplitudes 5400 and 5404 illustrated by FIG. 5. Accordingly these optical components experience phase shifts that are different by the amount similar to $d(\Delta\phi_1 - \Delta\phi_2)$ of FIG. 5 that is equal to $\pi$ radians.

To switch the output signal from being emitted by port 5704, as signal 5726, to be emitted from port 5706, as signal 5728, while input signal 5724 at port 5702 is the same, the relative phase shift between the optical components of input signal 5724 propagating clockwise and counterclockwise in loop 5312 should be changed from $\pi$ radians either to zero radians, denoted as zero relative phase, or to $2 \cdot \pi \cdot m$, where m is an integral number (1, 2, . . .).

A zero relative phase shifts between the optical components of input signal 5724 propagating clockwise and counterclockwise in loop 5312 may be achieved by reducing injection current 5707 injected to NLE 5316 via terminal 5708 to be at a level $C_7$. In this case, the current level $C_7$ of signal 5707 at port 5708 is adjusted to create lower excitation level of NLE 5316 in which both of the optical components of input signal 5724 propagating clockwise and counterclockwise in loop 5312 are in the saturated region of NLE 5316, resulting with the same phase shift, produced by NLE 5316 for both of the optical components in loop 5312. Thus the optical components of input signal 5724 at loop 5312 are combined, by coupler 5302, to produce output signal 5728 received at external I/O port 5706 from port 5304 via coupler 5305 and port 5307. In this case no signal is produced at port 5704.

A relative phase shifts of $2 \cdot \pi \cdot m$ radians (m=1, 2, 3 . . .) between the optical components of input signal 5724 propagating clockwise and counterclockwise in loop 5312 may be achieved by adjusting injection current 5707 injected to NLE 5316 via terminal 5708 to be at a level $C_8$. In this case, the current level $C_8$ of signal 5707 is adjusted to create excitation level of NLE 5316 in which the optical components of input signal 5724 propagating clockwise and counterclockwise in loop 5312 experience different phase shifts in NLE 5616 which are different by an amount greater than the amount which is produced when NLE 5316 is excited by injection current 5707 of level $C_5$. When the current level $C_8$ of injection current 5707 is adjusted properly, the relative phase shift between the optical components in loop 5312 may be $2 \cdot \pi \cdot m$ radians instead of being $\pi$ radians as when excitation current 5707 at port 5708 is with current level of $C_5$. Thus the optical components of input signal 5724 at loop 5312 are combined, by coupler 5302, to produce output signal 5728 received at external I/O port 5706 from port 5304 via coupler 5305 and port 5307. In this case no signal is produced at port 5704.

It can be seen that by switching the amount of current 5707 injected to NLE 5316 via port 5708 from being with level $C_5$ to have level $C_7$ or $C_8$, the output signal switches the port from which it is emitted from port 5704, as signal 5726 (at current 5707 with current level $C_5$), to be emitted by port 5706, as signal 5728 (at currents 5707 with current level $C_7$ or $C_8$).

The response time of switch 5700 equals to the lifetime of the charge carriers in NLE 5316 and is in the range of 200 ps. To shorten the response time of switch 5700, the current 5707 injected to NLE 5316 may be decreased from current level $C_5$ to $C_X$ while the amount of current injected to attenuator 5314 may be increased from $C_6$ to $C_X$. In this situation, NLE 5316 and attenuator 5314 have the same injection current $C_X$ and operate similarly. Thus, in this situation, loop 5312 is a symmetric loop and acts as a simple mirror loop that reflects the signal back into terminal 5304 and from there to device terminal 5706, as signal 5728, via coupler 5305 and guide 5307. The difference between levels $C_5$ and $C_X$ and between levels $C_X$ and $C_6$ used to perform the switching by changing both of the injected current, may be smaller than the difference between levels $C_5$ and $C_7$ or between levels $C_5$ and $C_8$ used to perform the switching by changing only injected current 5707 injected to NLE 5316, via terminal 5708. Thus when changing both of the injected currents, current 5707 injected to NLE 5316 and the current injected to attenuator 5314, the switching time of switch 5700 may be reduced to be shorter than 200 ps. To make the response time of switch 5700 even faster, an optical activation may be used as illustrated by FIG. 10b.

Switch 5700 may be operated as a gate by monitoring only one of the devices' outputs, 5704 or 5706.

The use of loop 5312 makes device 5700 phase insensitive.

FIG. 10b illustrates switch 5701 similar to switch 5700 of FIG. 10a with the exception that the state of NLE 5316 is changed optically by coupling optical signal 5734 into NLE 5316 via input guide 5716 and coupler 5718, instead of changing the injected current 5707 injected to NLE 5316 through terminal 5708 as shown in FIG. 10a. Since device 5701 is similar to device 5700 of FIG. 10a, the explanation provided in the description to FIG. 10a stands also for FIG. 10b and will not be repeated here. FIG. 10b is different from FIG. 10a in a way that NLE 5316 is excited to produce a state change of switch 5701. This process is described below.

In the normal state of device 5701, input signal 5730 propagates from input port 5702 and appears only at one output 5704 or 5706 as signal 5732 or signal 5733, respectively. For example and without any limitations, the emitting port in the normal state may be port 5704 that emits signal 5732 and no signal is produced at port 5706. In the normal state of device 5701, NLE 5316 is excited, by injection current 5707 supplied to NLE 5316 via terminal 5708. Injected current 5707 is adjusted to excite NLE 5316 above the excitation level in which the small optical component of input signal 5730 propagating in loop 5312 can drive NLE into a saturation state. To switch between the emitting ports 5704 and 5706 of switch 5701, an optical signal 5734 is coupled to port 5716 and from there via coupler 5718 into NLE 5316. Signal 5734 may be coupled out, by coupler 5722, into guide 5720. When couplers 5718 and 5722 are wavelength sensitive, signal 5734 may be completely coupled into NLE 5316 and out from NLE 5316 without affecting the propagation of the optical components of input signal 5730 in loop 5312 having a wavelength that is different from the wavelength of signal 5734. Alternatively, an optical isolator or an optical wavelength sensitive filter may be included in input terminal 5702 to avoid the propagation of signal 5734 toward the source of input signal 5730. Such wavelength sensitive filters may be included in ports 5704 and 5706 to separate between signals 5732 and 5733 and activation signal 5734.

The use of wavelength filters at the input port and/or output terminals may be applied to all of the embodiments according to the present invention for separating the information signals from the activating signals, even if it was not specifically illustrated by the drawings.

Signal 5734 having intensity $P_2$ that may deplete, by stimulated emission, the inverse population of charge carriers produced by the excitation of current 5707 injected to NLE 5316 via terminal 5708. Accordingly, the injection of optical pulse 5734 into NLE 5316 is equivalent to a reduction of the injection level of current 5707 injected into NLE 5316 from terminal 5708. In the presence of optical pulse 5734 at port 5716, the phase shift that NLE 5316 produces may be changed by $\pi$ radians and causes the optical components of input signal 5730 propagating in loop 5312 to be combined constructively and destructively, by coupler 5302, at ports 5304 and 5306, respectively, to produce signal 5733 at port 5706 when no signal is produced at port 5704.

Thus switching the output signal between ports 5704 and 5706 is performed by the presence or absence of optical signal 5734 at port 5716.

While in switch 5700 of FIG. 10a the switching is performed by changing injected current 5707 at terminal 5708 from level $C_5$ to $C_7$ and vice versa, the normal state of switch 5701 may be operated with injection current 5707 having a constant level of $C_5$ while the switching is performed by injecting optical signal 5734 to NLE 5316, via port 5716, that effectively change the excitation level of NLE 5316 into a similar level that injection current 5707 with current level $C_7$ produces. It should be clear that the current injected via terminal 5708 of switch 5701 is maintained fixed during the switching and the effective excitation is only changed by the injection of optical signal 5734 to NLE 5316, via port 5716.

The effect of the optical injection may be analyzed in an alternative way. When injected signal 5734 is present inside NLE 5316 at the time that the optical components of input signal 5730 is propagating in NLE 5054, the intensities of both optical signals in NLE 5316 are superimposed and the component of input signal 5730 appear in NLE 5316 as being with higher intensity. The effective higher intensity of the optical component of signal 5730 may experience, in NLE 5316, a phase shift that is greater by $\pi$ radians than the phase shift that these optical components would experience, in NLE 5316, in the absence of signal 5734 in NLE 5316.

The state of NLE 5316 may change by injecting signal 5734 from ports other than port 5716. Signal 5734 may be injected via port 5742 to be coupled into I/O terminal 5304 via coupler 5740, guide 5307 and coupler 5305. Similarly, signal 5734 may be injected via port 5738 to be coupled into I/O terminal 5306 via coupler 5736. In both cases, signal 5734 is split, by coupler 5302, into two components propagating clockwise and counterclockwise in loop 5312. The optical components of signal 5734 in loop 5312 change the excitation state of NLE 5316 or are added to the optical components of input signal 5730 in loop 5312 to change the switching state of switch 5701 in a way similar to the explained above when optical signal 5734 is coupled to NLE 5316 via port 5716. Alternatively, the injection of signal 5734 into guide 5307 or 5306 may be done by injecting signal 5734 directly into I/O port 5733 or 5732, respectively.

As explained above, switch 5701 may be operated as a gate when only one output port is used to monitor the output signal. The response time of switch (or gate) 5701 is equal to the recovery time of NLE 5316 and is in the range of 10 ps.

It should be clear that all the electronic activating signals, such as, signals 5524, 5610, and 5707 of FIGS. 8a, 9a, and 10a, my be in a form of electrical pulses or in a form of dc current or voltage. Similarly, all the optical activating signals, such as, signals 5586, 5658, and 5734 of FIGS. 8b, 9b, and 10b, may be in a form of optical pulses or in a form of Continuous Wave (CW).

When signal 5734 is in a form of CW radiation, it may fill the whole medium of loop 5312 and its components propagate simultaneously through NLE 5316 and thus experience the same phase shift produced by NLE 5316. Accordingly, no relative phase shift is produced between the components of CW signal 5734 in loop 5312. In this case, signal 5734 is reflected back from loop 5312 via the same port from which it is coupled into loop 5312. If switch 5701 is operated as a gate in which the output signal 5733 is monitored only at port 5706 and signal 5734 is injected from port 5704, there is no mixing between output signal 5733 and activating signal 5734. When device 5701 operates as a switch, both ports 5704 and 5706 are used to monitor output signals and its activating signal is coupled from one of ports 5704 or 5706, the separation between activating signal 5734 and output signal 5732 or 5733 may be done by using optical isolators at port 5704 or 5706 (not shown) to block signal 5734 reflected back into one of these ports. Alternatively, signal 5734 may be with a wavelength that is different from the wavelength of signals 5732 and 5733 and the separation between signal 5734 and signals 5732 and 5733 may be done by wavelength sensitive filters that are included in ports 5704 and 5706 or at one of these ports (not shown).

The design of FIG. 10b where coupler 5718 is included in optical loop 5312 containing attenuator 5314 may be modified by removing attenuator 5314. In this case, coupler 5718 may be adjusted to produce attenuation similar to the attenuation of attenuator 5314 that has been removed from loop 5312. Accordingly, coupler 5718 performs two functions, the first is to couple activating signal 5734 from port 5716 into loop 5312 and the second is to produce signal intensity loss by coupling part of the energy out of loop 5312 in a way similar to the illustrated by FIG. 4*b* where coupler 5314A of FIG. 4*b* performs as attenuator 5314 in FIG. 4*a*. The attenuation that coupler 5718 produces in loop 5312 may be adjusted using variable coupler 5718 to select the proper coupling ratio needed to produce the desirable loss in loop 5312. While the modified design of FIG. 10*b* that does not include attenuator 5314 may resemble the structure of the Terahertz Optical Asymmetric Demultiplexer (TOAD), in fact they are very different one from another. The coupling device according to the modified design of FIG. 10*b* differs from the TOAD in the following aspects:

1. The TOAD is designed to couple the activating signal into the loop without loss. The TOAD cannot work as designed when loss is introduced in its optical loop by the coupling of the activating signal. The modified design of FIG. 10*b* introduces loss at the coupling point of the activating signal on purpose, a loss which may be further adjusted to a proper value.

2. The activating signal of the TOAD must be a pulse modulated signal that is synchronized with the information signals at its optical loop. The TOAD can not be operated by a CW activating beam. The activating signal of the modified design of FIG. 10*b* may be a CW beam.

Switches 5700 and 5701 of FIGS. 10*a* and 10*b*, respectively, are phase insensitive due to the use of optical loop and are unique in the sense that in spite of the use of optical loop, they may perform the switching even while the activating signals 5707 or 5734 are in the form of dc current (or voltage) and CW radiation, respectively.

In all the switches and gates according to the present invention, there is an output port which emits the output signal in a normal state of the switch. In the presence of an activating signal, the switch changes the output port from which the output signal is emitted. This change lasts as long as the activating signal is present. The presence time of the activating signal is equal to the time width of the pulse of the activating signal or to the time period in which a dc or CW activating signal is present.

It should be noted that the numerical data mentioned within the embodiments described above, for example, the specific NLE activation time or response time or recovery time, are all examples of a certain NLE technology. As NLE technology improves, the NLE devices' inherent timings and speeds may still limit the switching speed of the described switches and gates, but may produce faster switching responses than mentioned.

All the embodiments according to the present, may include a continuous sequence of optical components connected by light guiding media such as, for example, optical fibers, planar waveguides, or planar circuits (PLC), which media may be fabricated using integrated optic techniques and/or on-chip manufacturing. Alternatively, All the embodiments according to the present may be constructed from discrete components, in which case the optical guiding media may be replaced by open space, e.g., vacuum, or by a non-solid, e.g., gaseous media, and the directional couplers may be replaced with beam splitters. It should be understood that all amplifiers and attenuators may include variable and/or adjustable components. It should be clear that all amplifiers may made of amplifying media and devices and in particular are made of SOA's, LOA's and EDFA's. It should be appreciated that all attenuators are made of attenuating media and devices and in particular are made of couplers, directional couplers and absorbing amplifiers.

It should be clear that the embodiments according to the present invention may include in their output ports equalizing devices and specifically attenuators to equalize the intensities of the signals from the different output ports.

It should be understood that the switches according to the present invention may include wavelength filters in their inputs and/or outputs for separating the information signal from the activating signal.

It should be clear that while some of the coupling devices are illustrated as couplers they may be circulators as well.

It should be understood that while some of the activating signals are illustrated as either being in a form of pulses or CW beam they may all be each of them or both of them, i.e. in a form of pulses and/or CW beam.

It should be clear that the activating signals according to the present invention may be with the same or different wavelength as the wavelength of the information signal.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

We claim:

1. An optical switch comprising:
    a splitting device having first, second, third, and fourth terminals;
    a nonlinear element;
    an attenuator; and
    an optical loop associated with said third and fourth terminals, said optical loop including said attenuator and said nonlinear element, said nonlinear element being displaced from a mid-point of said optical loop,
    wherein said splitting device is able to receive an input signal via one of said first and second terminals and an activating signal via one of said first and second terminals, to split said input signal into optical components counter-propagating in said optical loop, and to provide an output signal at either said first terminal or said second terminal in response to said activating signal,
    wherein at least one of said first and second terminals includes a coupling device for coupling said activating signal from an activating terminal into said one of said first and second terminals, and
    wherein said nonlinear element is arranged in a position that does not lie on a collision point of the optical components of said input signal counter propagating in said optical loop.

2. The switch of claim 1 wherein said optical loop is arranged to further include a second coupling device for coupling a second activating signal into said nonlinear element.

3. The switch of claim 1 wherein said splitting device is a symmetric coupler.

4. The switch of claim 1 wherein said nonlinear element is further arranged to include an electronic terminal for receiving an electronic activating signal.

5. The switch of claim 4 wherein said non-linear element is arranged to produce an output signal at one of said first and second outputs in response to said electronic activating signal.

6. The switch of claim 1 wherein said nonlinear element is selected from a group including semiconductor optical amplifiers and linear optical amplifiers.

7. The switch of claim 1 wherein said coupling device is selected from a group including directional couplers and circulators.

8. The switch of claim 1 comprising at least one optical fiber.

9. The switch of claim 1 comprising at least one planar waveguide.

10. The switch of claim 1 comprising integrated optics.

11. The switch of claim 1 comprising a planar optical circuit.

12. The switch of claim 1 comprising an on-chip optical device.

13. The switch of claim 1 comprising at least in part a gaseous medium or vacuum.

14. The switch of claim 1 wherein said switch includes a portion of a waveguide.

15. The switch of claim 1 wherein said activating signal includes pulses.

16. The switch of claim 1 wherein said activating signal is a continuous wave beam.

17. The switch of claim 1 wherein said attenuator is selected from a group including optical amplifiers and couplets.

18. The switch of claim 1 wherein said one of said second and third terminals includes an equalizing device.

19. The switch of claim 1 wherein said equalizing device is selected from a group including attenuators and optical amplifiers.

20. The switch of claim 1 wherein said activating signal and said input signal have different wavelengths.

21. The switch of claim 1 comprising a wavelength filter.

22. The switch of claim 1 wherein said activating signal and said input signal have the same wavelength.

23. The switch of claim 1 comprising an isolator.

24. An optical switch comprising:
a splitting device having first, second, third, and fourth terminals;
a nonlinear element;
a coupling device; and
an optical loop associated with said third and fourth terminals, said optical loop including said nonlinear element, displaced from a mid-point of said optical loop, and said coupling device, which is able to produce loss in said optical loop and to couple a continuous wave activating signal from an activating terminal into said clement optical loop,
wherein said splitting device is arranged to receive an input signal via one of said first and second terminals and to provide an output signal at either-said either said first terminal or said second terminal in response to said continuous wave activating signal.

25. The switch of claim 24 wherein one of said first and second terminals we is further arranged to include a an output coupling device for coupling said output signal from one of said first and second terminals into a fifth terminal.

26. The switch of claim 24 wherein said optical loop includes an attenuator.

27. The switch of claim 26 wherein said attenuator is selected from a group including optical amplifiers and couplers.

28. The switch of claim 24 wherein said optical loop is arranged to further include a second coupling device for coupling a second activating signal into said nonlinear element.

29. The switch of claim 24 wherein said splitting device is a symmetric coupler.

30. The switch of claim 24 wherein said nonlinear element is further arranged to include an electronic terminal for receiving an electronic activating signal.

31. The switch of claim 30 wherein said non-linear element is arranged to produce an output signal at one of said first and second outputs in response to said electronic activating signal.

32. The switch of claim 24 wherein said nonlinear element is selected from a group including semiconductor optical amplifiers and linear optical amplifiers.

33. The switch of claim 24 wherein said coupling device is selected from a group including directional couplers and circulators.

34. The switch of claim 24 comprising at least one optical fiber.

35. The switch of claim 24 comprising at least one planar waveguide.

36. The switch of claim 24 comprising integrated optics.

37. The switch of claim 24 comprising a planar optical circuit.

38. The switch of claim 24 comprising an on-chip optical device.

39. The switch of claim 24 comprising at least in pail a gaseous medium or vacuum.

40. The switch of claim 24 wherein said switch includes a portion of a waveguide.

41. The switch of claim 24 wherein said attenuator is selected from a group including optical amplifiers and couplers.

42. The switch of claim 24 wherein said one of said second and third terminals includes an equalizing device.

43. The switch of claim 42 wherein said equalizing device is selected from a group including attenuators and optical amplifiers.

44. The switch of claim 24 wherein said activating signal and said input signal have different wavelengths.

45. The switch of claim 24 comprising a wavelength filter.

46. The switch of claim 24 wherein said activating signal and said input signal have the same wavelength.

47. The switch of claim 24 comprising an isolator.

* * * * *